US012009589B2

(12) United States Patent
Yang et al.

(10) Patent No.: US 12,009,589 B2
(45) Date of Patent: Jun. 11, 2024

(54) TERMINAL DEVICE

(71) Applicant: Huawei Technologies Co., Ltd., Shenzhen (CN)

(72) Inventors: Yu Chan Yang, Shenzhen (CN); Chien-Ming Lee, Shenzhen (CN); Hanyang Wang, Reading (GB); Yi-Hsiang Liao, Shenzhen (CN); Lizhong Huang, Dongguan (CN); Guangxiang Zhu, Shanghai (CN); Bin Yu, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 376 days.

(21) Appl. No.: 17/421,870

(22) PCT Filed: Jan. 9, 2020

(86) PCT No.: PCT/CN2020/071207
§ 371 (c)(1),
(2) Date: Jul. 9, 2021

(87) PCT Pub. No.: WO2020/143719
PCT Pub. Date: Jul. 16, 2020

(65) Prior Publication Data

US 2022/0109234 A1 Apr. 7, 2022

(30) Foreign Application Priority Data

Jan. 9, 2019 (CN) ......................... 201910019373.6
Feb. 3, 2019 (CN) ......................... 201910108932.0

(51) Int. Cl.
*H01Q 1/24* (2006.01)
*H01Q 1/38* (2006.01)
*H01Q 1/40* (2006.01)
*H01Q 1/52* (2006.01)

(52) U.S. Cl.
CPC ............... *H01Q 1/40* (2013.01); *H01Q 1/243* (2013.01); *H01Q 1/38* (2013.01); *H01Q 1/52* (2013.01)

(58) Field of Classification Search
CPC ............ H01Q 1/40; H01Q 1/243; H01Q 1/38; H01Q 1/52; H01Q 1/36; H01Q 1/22; H05K 1/181; H05K 5/0217
See application file for complete search history.

(56) References Cited

U.S. PATENT DOCUMENTS

| | | | |
|---|---|---|---|
| 8,537,072 B2 | 9/2013 | Jensen et al. | |
| 2003/0142018 A1 | 7/2003 | Lange | |
| 2008/0008890 A1 | 1/2008 | Li | |
| 2009/0051620 A1 * | 2/2009 | Ishibashi ................. | H01Q 9/16 343/897 |

(Continued)

FOREIGN PATENT DOCUMENTS

| | | |
|---|---|---|
| CN | 101180765 A | 5/2008 |
| CN | 201425967 Y | 3/2010 |

(Continued)

*Primary Examiner* — David E Lotter
(74) *Attorney, Agent, or Firm* — Conley Rose, P.C.

(57) ABSTRACT

A terminal device includes a housing and a metal line that is disposed on an outer surface of the housing or is embedded in the housing, and the metal line is configured to receive or send an electromagnetic wave signal. The metal line acts as an antenna of the terminal device.

20 Claims, 23 Drawing Sheets

(56) References Cited

U.S. PATENT DOCUMENTS

| | | | |
|---|---|---|---|
| 2010/0033400 A1 | 2/2010 | Chang et al. | |
| 2010/0326722 A1* | 12/2010 | Watazu | B32B 27/32 428/196 |
| 2015/0085432 A1* | 3/2015 | Memering | H01Q 1/2258 361/679.01 |
| 2015/0249284 A1 | 9/2015 | Iriyama | |
| 2017/0005392 A1 | 1/2017 | Hwang et al. | |
| 2017/0324143 A1* | 11/2017 | Talty | H01P 5/085 |
| 2018/0026359 A1 | 1/2018 | Desclos et al. | |
| 2020/0021008 A1* | 1/2020 | Yong | H01Q 21/005 |
| 2020/0052368 A1 | 2/2020 | Xia et al. | |

FOREIGN PATENT DOCUMENTS

| | | | |
|---|---|---|---|
| CN | 103179815 | A | 6/2013 |
| CN | 103327139 | A | 9/2013 |
| CN | 103633424 | A | 3/2014 |
| CN | 203826540 | U | 9/2014 |
| CN | 104953267 | A | 9/2015 |
| CN | 104953270 | A | 9/2015 |
| CN | 106848561 | A | 6/2017 |
| CN | 107181043 | A | 9/2017 |
| CN | 107492715 | A | 12/2017 |
| CN | 107611564 | A | 1/2018 |
| CN | 108232425 | A | 6/2018 |
| CN | 108494913 | A | 9/2018 |
| CN | 108539386 | A | 9/2018 |
| CN | 108565546 | A | 9/2018 |
| CN | 108682936 | A | 10/2018 |
| CN | 108899633 | A | 11/2018 |
| CN | 208045688 | U | 11/2018 |
| CN | 208112888 | U | 11/2018 |
| CN | 109119768 | A | 1/2019 |
| CN | 110021821 | A | 7/2019 |
| EP | 2246185 | A1 | 11/2010 |
| EP | 2421089 | A2 | 2/2012 |
| EP | 3014380 | A1 | 5/2016 |
| WO | 2015042335 | A1 | 3/2015 |
| WO | 2018062947 | A1 | 4/2018 |

* cited by examiner

TERMINAL DEVICE

CROSS-REFERENCE TO RELATED APPLICATIONS

This is a U.S. National Stage of International Patent Application No. PCT/CN2020/071207 filed on Jan. 9, 2020, which claims priority to Chinese Patent Application No. 201910108932.0 filed on Feb. 3, 2019 and Chinese Patent Application No. 201910019373.6 filed on Jan. 9, 2019. All of the aforementioned applications are hereby incorporated by reference in their entireties.

TECHNICAL FIELD

This application relates to the field of electronic devices, and more specifically, to a terminal device.

BACKGROUND

Currently, functions of terminal devices are increasingly rich, and a communication range covered by a terminal device is also increasingly wide. Therefore, terminal devices have an increasingly high requirement on a quantity of antennas. How to arrange more antennas in limited space is a problem that needs to be resolved urgently in the antenna structure field.

Currently, a common antenna structure for a terminal device is a built-in antenna. The antenna is arranged inside the terminal device. However, as various components and functions impose increasingly high requirements on the terminal device, more electronic parts and components need to be integrated into the terminal device. Therefore, performance of the antenna is also compromised due to a limitation of an internal structure of the terminal device. As a result, a height (distance) between the antenna and a circuit board of the terminal device is relatively short. This also greatly reduces clearance space for radiation of the antenna, resulting in relatively large interference of a metal component on the circuit board to the radiation of the antenna. Therefore, the antenna is prone to be limited in terms of a degree of spatial freedom, antenna efficiency, and bandwidth, failing to meet current multi-antenna and multiband design requirements and seriously affecting the performance of the antenna and quality in use of the terminal device.

SUMMARY

This application provides a terminal device. A metal line (an antenna) of the terminal device is disposed on an outer surface of a housing of the terminal device or embedded in the housing. This can increase a distance from the metal line to a circuit board of the terminal device, thereby reducing interference of a metal component on the circuit board to radiation of the metal line (radiation of the antenna) and improving operating bandwidth and efficiency of the antenna.

According to a first aspect, a terminal device is provided. The terminal device includes a housing and a metal line. The metal line is disposed on an outer surface of the housing or embedded in the housing, and the metal line is configured to receive or send an electromagnetic wave signal.

In the terminal device provided in the first aspect, the metal line (an antenna) of the terminal device is disposed on the outer surface of the housing of the terminal device or embedded in the housing. This can increase a distance from the metal line to a circuit board of the terminal device, thereby reducing interference of a metal component on the circuit board to radiation of the metal line (radiation of the antenna) and improving operating bandwidth and efficiency of the antenna. The metal line is not disposed in a body of the terminal device, so that the metal line can be insusceptible to electronic parts and components in the body of the terminal device in terms of a structure and space. This can greatly increase a degree of spatial freedom of the metal line, and further improve operating efficiency of the antenna of the terminal device, thereby improving signal receiving or signal sending quality of the terminal device.

In some possible implementations, the housing is an insulated housing, and the metal line is disposed on an outer surface of the insulated housing or embedded in the insulated housing.

In some possible implementations, the terminal device further includes: a circuit board, where the circuit board is configured to hold electronic parts and components; and a signal line, where the signal line is disposed on the circuit board, an interval exists between the signal line and the metal line, and the signal line and the metal line feed in the electromagnetic wave signal through the gap in a coupling manner. In this implementation, feed-in in a coupling manner can enable the terminal device to accurately receive and send an electromagnetic wave signal, and avoid instability problems such as loose contact caused by a direct feed-in manner, thereby further improving the operating efficiency and quality of the antenna of the terminal device.

In some possible implementations, when the metal line is disposed on the outer surface of the housing, a protective film is disposed on a surface of the metal line, or a protective film is disposed on the outer surface of the housing. In this implementation, problems such as wear and peel-off of the metal line can be prevented, further improving durability and use quality of the metal line and extending a service life of the metal line.

In some possible implementations, the housing includes a plurality of insulation layers, and the metal line is embedded between any two of the plurality of insulation layers.

In some possible implementations, the plurality of insulation layers are two insulation layers, the two insulation layers are both plastic layers, or the two insulation layers are both glass layers, or one of the two insulation layers is a glass layer and the other layer is a plastic layer, and the metal line is embedded between the two insulation layers.

In some possible implementations, the plurality of insulation layers are two insulation layers, one of the two insulation layers is glass and the other insulation layer is PET plastic, and the metal line is embedded between the two insulation layers.

In some possible implementations, the plurality of insulation layers are two insulation layers, the two insulation layers are both glass layers, and the metal line is embedded between the two insulation layers.

In some possible implementations, one of the two insulation layers is glass and the other insulation layer is PET plastic, a PVB layer exists between the glass layer and the PET plastic layer, and the metal line is disposed between the PVB layer and the PET plastic layer, or the metal line is disposed between the PVB layer and the glass layer.

In some possible implementations, the two insulation layers are both glass layers, a PVB layer exists between the two glass layers, and the metal line is disposed between any one of the two glass layers and the PVB layer.

In some possible implementations, the metal line is a translucent metal line.

In some possible implementations, a transmittance of the metal line is Y, and a value range of Y is 50%≤Y≤95%.

In some possible implementations, the housing includes two insulation layers, and the metal line is embedded between the two insulation layers.

In some possible implementations, a distance between the signal line and the metal line is X, and a value range of X is 0.1 mm≤X≤5 mm.

In some possible implementations, the housing is a glass housing.

In some possible implementations, a manner of forming the protective film includes: any one of a physical vapor deposition manner, a chemical vapor deposition manner, a ceramic coating manner, a hard coating solution manner, or a film attaching manner.

In some possible implementations, the metal line includes any one of a metal mesh, silver paste, or a copper wire.

In some possible implementations, when the metal line is a metal mesh, the metal mesh is coated with a metal layer, and the metal layer is configured to reduce impedance of the metal mesh.

In some possible implementations, the metal layer is a copper-coated layer.

In some possible implementations, a metallic nickel layer is further coated outside the metallic copper layer.

In some possible implementations, the housing is a ceramic housing, and the metal line is disposed on a surface of the ceramic housing or embedded in the ceramic housing.

In some possible implementations, a surface of the metal line is coated with glass glaze.

In some possible implementations, the outer surface of the housing is coated with glass glaze.

In some possible implementations, the metal line is a meshed metal line.

In some possible implementations, a line width of the meshed metal line ranges from 0.1 μm to 50 μm.

In some possible implementations, one or more regions on the housing are provided with a mesh-shaped metal line.

In some possible implementations, the plurality of insulation layers are two insulation layers, the metal line is disposed between the two insulation layers, and one of the two insulation layers is a composite material layer and the other layer is a polyurethane PU layer.

In some possible implementations, the plurality of insulation layers are two insulation layers, the metal line is disposed between the two insulation layers, and one of the two insulation layers is a composite material layer and the other layer is a leather layer.

In some possible implementations, a ceramic material for preparing the ceramic housing is any type of ceramics such as zirconium oxide, aluminum oxide, silicon carbide, silicon nitride, aluminum nitride, or boron carbide.

In some possible implementations, the composite material layer is prepared by using one or more of plastic cement, polycarbonate PC, plastic, or rubber.

DESCRIPTION OF EMBODIMENTS

Figure 1:
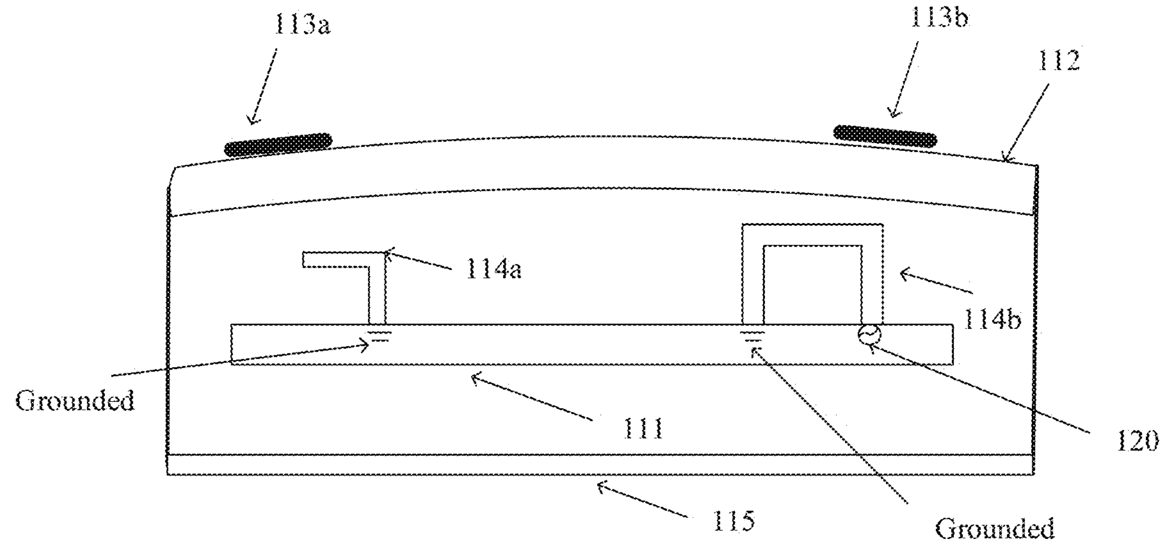
FIG. 1 is a side view of a schematic structure of a terminal device according to this application.

The following describes technical solutions of this application with reference to accompanying drawings.

Currently, functions of terminal devices (for example, mobile phones) are increasingly rich, and a communication range covered by a terminal device is also increasingly wide. Therefore, mobile phones have an increasingly high requirement on a quantity of antennas. As mobile phones become thinner and metal and glass housings are more widely used on mobile phones, increasingly high requirements are imposed on antenna design for mobile phones. How to arrange more antennas in limited space is a problem that needs to be resolved urgently in the antenna structure field.

Currently, common antenna structures are built-in antennas. In most antenna structures, an antenna support is used as an antenna radiator to receive or send an electromagnetic wave signal, and an antenna is disposed on the antenna support. An antenna formed on an antenna support (for example, by using a laser direct structuring technology) is arranged inside a mobile phone. Available antenna types include an inverted-F antenna (inverted-f antenna, IFA), a monopole antenna (Monopole), a loop (Loop) antenna, or the like. However, as various components and functions impose increasingly high requirements on the mobile phone, more electronic parts and components need to be integrated into the mobile phone. The antenna support also occupies internal space of the mobile phone. Therefore, performance of the antenna is also often compromised due to a limitation of an internal structure of the mobile phone. In addition, a height from the antenna to a circuit board of the mobile phone is relatively short. In other words, a distance between the antenna and the circuit board of the mobile phone is relatively short. This also greatly reduces clearance space for radiation of the antenna, resulting in relatively large interference of a metal component on the circuit board to the radiation of the antenna. Therefore, the antenna is prone to be limited in terms of a degree of spatial freedom, antenna efficiency, and bandwidth, failing to meet current multi-antenna and multiband design requirements.

Another type of built-in antenna is mainly plated on an inner surface of a glass rear cover (or referred to as a glass back cover) of a mobile phone by using the laser direct structuring (laser direct structuring, LDS) technology. An implementation thereof is as follows: An LDS coating is first spayed on the inner surface of the glass rear cover of the mobile phone, and then the antenna is formed on the LDS coating by using the LDS technology. However, glass is subject to a limitation of an LDS process (for example, use constraints of LDS, such as a requirement for particular equipment). Moreover, the LDS coating also affects an appearance of a glass outer surface, and problems such as antenna peel-off may also arise when the antenna is prepared on the surface of the glass rear cover. This greatly limits development of requirements of current mobile phones on an appearance color and structure test performance of an antenna.

Considering the foregoing problems, this application provides a terminal device. A height from an antenna (a metal line) of the terminal device to a circuit board of the terminal device is relatively high. In other words, the antenna and the circuit board are relatively far apart. This reduces impact of a metal component that is on the circuit board of the terminal device on radiation of the antenna, thereby improving bandwidth and efficiency of the antenna. A quantity and an area of antennas may be further increased as needed, and problems such as antenna wear and peel-off are resolved, thereby improving operating efficiency of the antenna of the terminal device and improving user experience.

FIG. 1 is a side view of a schematic structure of a terminal device according to this application. As shown in FIG. 1, the terminal device includes a circuit board 111, a housing 112, a metal line 113 (including 113*a* and 113*b*), and a signal line 114 (including 114*a* and 114*b*). The metal line 113 is disposed on an outer surface of the housing 112 or embedded in the housing 112. The metal line 113 is configured to receive or send an electromagnetic wave signal.

It should be understood that FIG. 1 is merely an example. Although not illustrated in FIG. 1, the terminal device may further include other components, for example, a display region 115 shown in FIG. 1, a power source, a camera, a sensor, and an input unit. Other components included in the terminal device are not limited in this application.

The circuit board 111 may be a main circuit board of the terminal device, and may be, for example, a printed circuit board (printed circuit board, PCB) or the like. The circuit board 111 is a support for various electronic parts and components inside the terminal device, and is also a carrier of electrical connections between the various electronic parts and components. The circuit board 111 is configured to hold the various electronic parts and components, cables, and the like included in the terminal device. The housing 112 is equivalent to a housing of the terminal device. More specifically, the housing 112 may be a rear cover (or a back cover) of the terminal device. For example, the housing 112 may be a region that is of the terminal device except the display region 115 and that is in direct contact with the outside. The region may be made of an insulating material. Using a smartphone as an example, the housing 112 may be a rear cover (a back cover) of the smartphone, or may be a sidewall region portion that is of the rear cover of the smartphone and that is connected to a display screen. The metal line 113 is equivalent to an antenna (an antenna radiator) of the terminal device. The metal line 113 (including 113*a* and 113*b*) radiates as the antenna of the terminal device. The metal line 113 is configured to receive an electromagnetic wave signal sent by another device or send an electromagnetic field wave signal to another device. The metal line 113 is disposed on the outer surface of the housing 112 or embedded in the housing 113. The signal line 114 (including 114*a* and 114*b*) is equivalent to a feed-in portion. The feed-in portion is configured to feed an electromagnetic wave signal received by the antenna radiator into the circuit board, or feed a signal generated by the circuit board into the antenna radiator for transmission. FIG. 1 shows two signal lines of different structures. The two signal lines 114 shown in FIG. 1 are both signal lines of a spring structure. The signal line 114*a* in FIG. 1 is an L-shaped signal line, and the signal line 114*b* is an inverted-U-shaped signal line. One end of the signal line 114*b* is grounded, and the other end of the signal line 114*b* is connected to a signal source 120. The signal source 120 is located on the circuit board 111. The signal source 120 is configured to generate a signal. The signal line feeds the signal generated by the signal source into the metal line for transmission.

Figure 2:
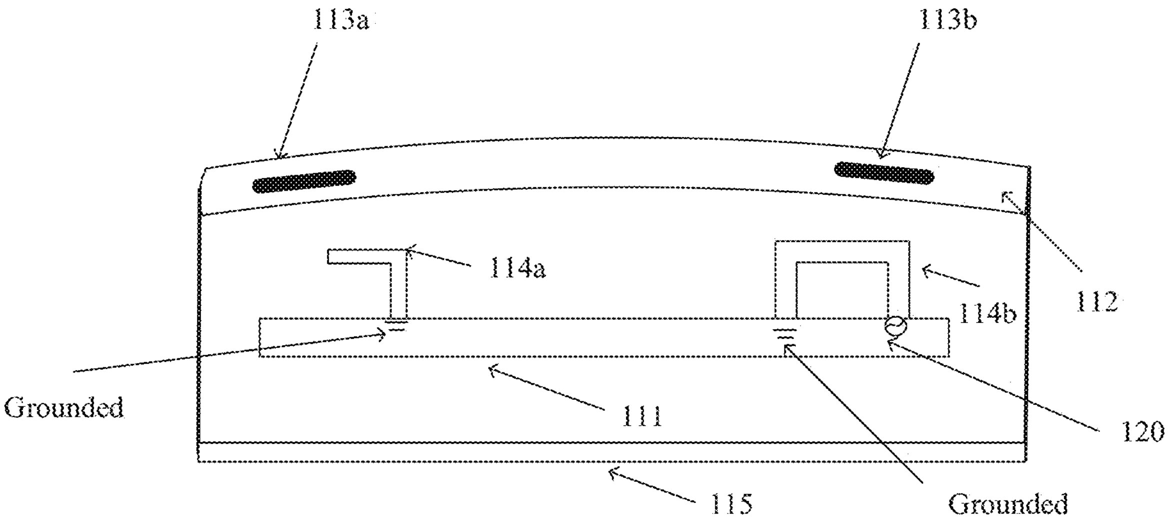
FIG. 2 is a side view of a schematic structure in which a metal line is embedded in a housing.
Figure 3:
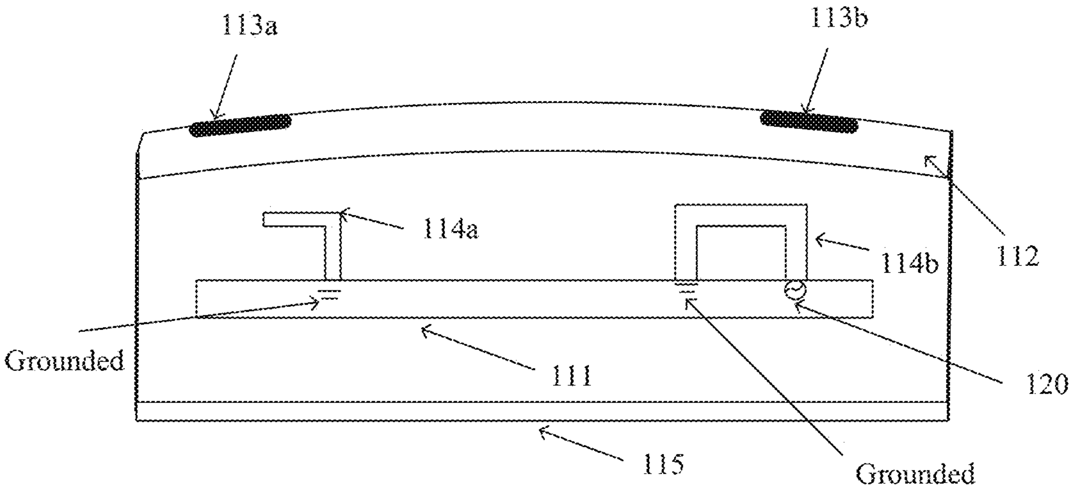
FIG. 3 is a side view of another schematic structure in which a metal line is disposed on an outer surface of a housing.

FIG. 1 is a side view of a schematic structure in which metal lines 113*a* and 113*b* are both disposed on an outer surface (an outer side) of a housing 112. FIG. 2 is a side view of a schematic structure in which metal lines 113*a* and 113*b* are both embedded in a housing 112. FIG. 3 is a side view of another schematic structure in which metal lines 113*a* and 113*b* are both disposed on an outer surface of a housing 112. The metal line 113 shown in FIG. 1 is disposed on the outer surface of the housing 112 through printing, bonding, metal coating, or the like. The metal line 113 and the housing 112 are not located on the same plane. For example, the metal line 113 may be fixed onto a transparent thin film layer (a thin film sheet), and the thin film layer with the metal line 113 is fixed onto the outer surface of the housing 112.

The metal line 113 shown in FIG. 3 may be disposed on the outer surface of the housing 112 through etching or the like. A height of the metal line 113 is the same as a height of the outer surface of the housing 112. Optionally, the metal lines 113*a* and 113*b* may alternatively be located at different positions. For example, the metal line 113*a* is disposed on the outer surface of the housing 112, and the metal line 113*b* is embedded in the housing 112. Alternatively, the metal line 113*b* is disposed on the outer surface of the housing 112, and the metal line 113*a* is embedded in the housing 112. This is not limited in this embodiment of this application.

In this embodiment of this application, the housing 112 may be an insulated housing, for example, may be a housing made of an insulating material (such as plastic or glass). The metal line 113 is located on an outer surface of or inside the insulated housing 112. Optionally, a noninsulated region may exist inside or on the outer surface of the insulated housing. For example, a noninsulated part or component (such as a metal sheet or copper foil) may be disposed on a partial region inside or on the outer surface of the insulated housing. However, the metal line 113 is disposed on an insulated region except the noninsulated region inside or on the outer surface of the insulated housing.

In this embodiment of this application, the housing 112 may alternatively be a noninsulated housing, for example, may be a housing made of metal. A partial region that is insulated may exist on an outer surface of the noninsulated housing, and the metal line 113 is disposed on the insulated region.

In summary, in this embodiment of this application, the metal line 113 is located on an insulated region of the outer surface of the housing 112, and the housing 112 may be an insulated. housing or may be a noninsulated housing.

It should be understood that, in this embodiment of this application, a quantity and a specific position and shape of the metal line 113 are not limited. Specifically, a quantity and a position of metal lines may be flexibly set based on operating bandwidth and efficiency of the terminal device. For example, a metal line may be located at a top portion, a middle portion, or a lower portion of an outer surface of an insulated rear cover of the terminal device. This is not limited in this embodiment of this application.

In the terminal device provided in this application, the metal line is disposed on the outer surface of the housing of the terminal device or embedded in the housing. This can increase a distance from the metal line to the circuit board of the terminal device, thereby reducing interference of a metal component on the circuit board to radiation of the metal line (radiation of the antenna) and improving operating bandwidth and efficiency of the antenna. The metal line is not disposed in a body of the terminal device, so that the metal line can be insusceptible to electronic parts and components in the body of the terminal device in terms of a structure and space. This can greatly increase a degree of spatial freedom of the metal line, and further improve the operating efficiency of the antenna of the terminal device, thereby improving signal receiving or signal sending quality of the terminal device.

As shown in FIG. 1 to FIG. 3, the signal line 114*a* is grounded, one end of the signal line 114*b* is grounded, the other end of the signal line 114*b* is connected to the signal source 120, and the signal source 120 is located on the circuit board 111. The signal source 120 is configured to generate a signal. The signal line feeds the signal generated by the signal source into the metal line for transmission.

Figure 4:
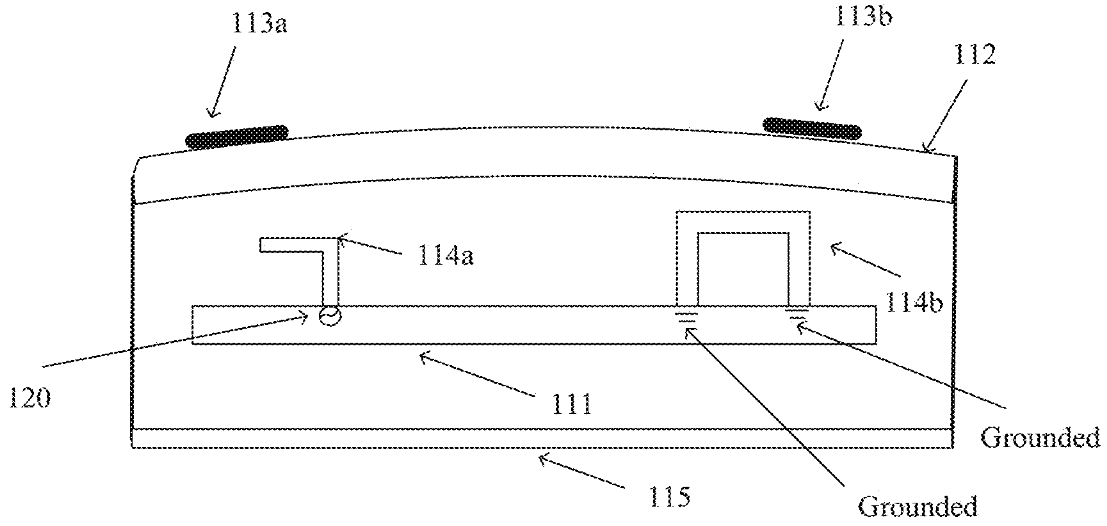
FIG. 4 is a side view of a schematic structure of a signal line in an example according to this application.
Figure 5:
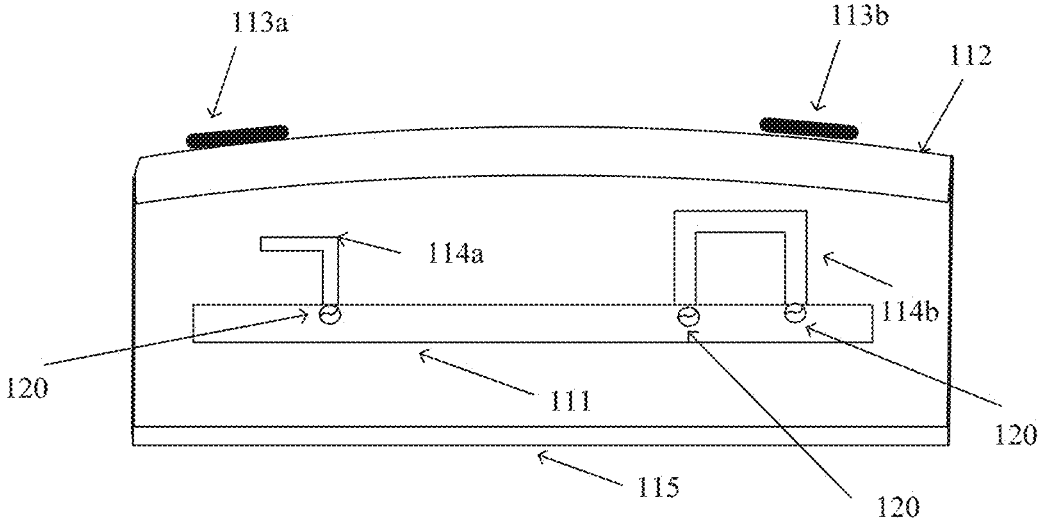
FIG. 5 is a side view of a schematic structure of a signal line in another example according to this application.

Optionally, as shown in FIG. 4, alternatively, a signal line 114*a* may be connected to a signal source 120, and both ends of a signal line 114*b* may be grounded. Alternatively, as shown in FIG. 5, a signal line 114*a* may be connected to a signal source 120, and both ends of a signal line 114*b* may be connected to the signal source 120. When the signal line 114*a* and both ends of the signal line 114*b* are grounded, the signal source 120 may transmit a generated signal to the signal line 114*a* and the signal line 114*b* through the circuit board 111.

It should be understood that, in this embodiment of this application, the signal line may alternatively be in another shape. This is not limited in this embodiment of this application.

Figure 6:
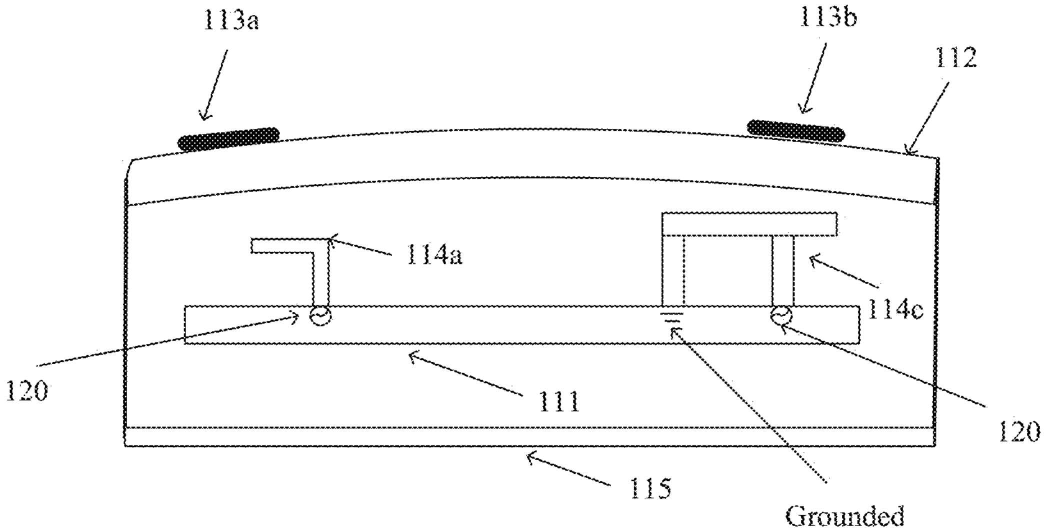
FIG. 6 is a side view of a schematic structure of a signal line in still another example according to this application.

For example, a signal line 114*c* shown in FIG. 6 is a possible shape of a signal line. One end of the signal line 114*c* is grounded, and the other end of the signal line 114*c* is connected to a signal source 120. Optionally, both ends of the signal line 114*c* may be grounded. Alternatively, both ends of the signal line 114*c* may be connected to the signal source 120.

Figure 7:
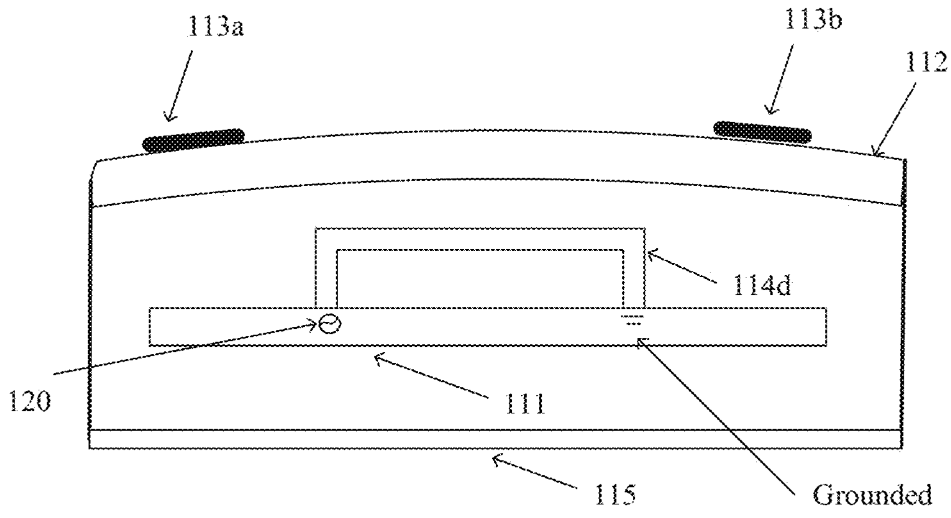
FIG. 7 is a side view of a schematic structure of a signal line in yet another example according to this application.
Figure 8:
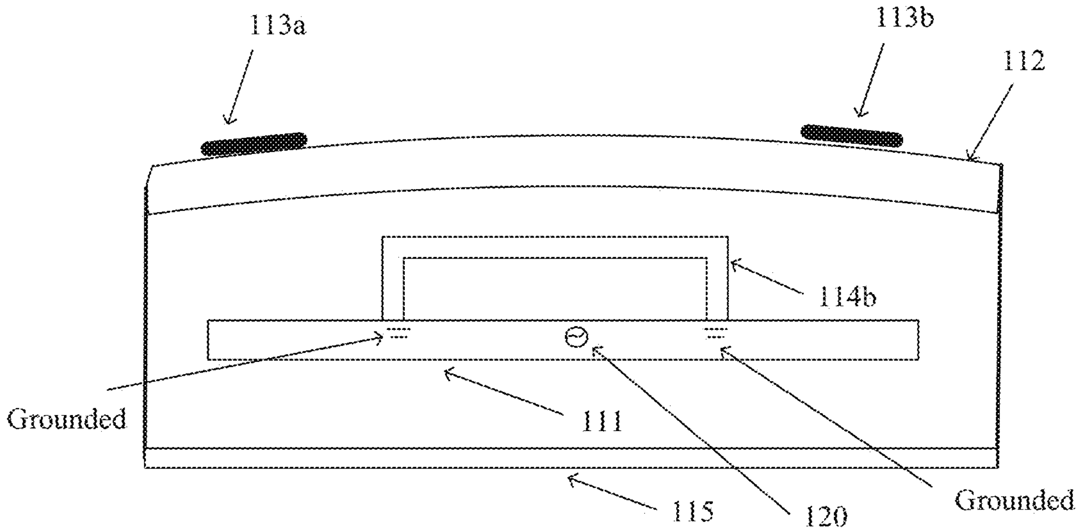
FIG. 8 is a side view of a schematic structure of a signal line in still yet another example according to this application.

For another example, a signal line 114*d* shown in FIG. 7 is another possible shape of a signal line. One end of the signal line 114*d* is grounded, and the other end of the signal line 114*d* is connected to a signal source 120. Optionally, as shown in FIG S. both ends of a signal line 114*d* may be grounded, and a signal source 120 may transmit a generated signal to the signal line 114*d* through a circuit board 111. Optionally, both ends of the signal line 114*d* may be connected to the signal source 120.

Figure 9:
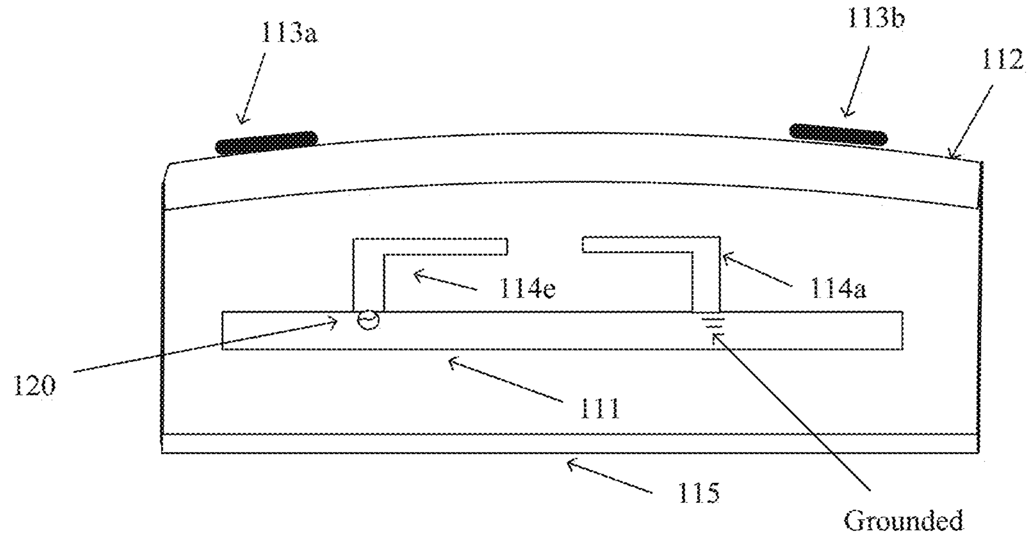
FIG. 9 is a side view of a schematic structure of a signal line in a further example according to this application.

For another example, FIG. 9 is a schematic diagram illustrating that there are two signal lines on a circuit board 111. Signal lines 114*a* and 114*e* shown in FIG. 9 are both L-shaped signal lines. The signal line 114*a* is grounded, and the signal line 114*e* is connected to a signal source 120. Optionally, alternatively, the signal line 114*a* may be connected to the signal source 120, and the signal line 114*e* may be grounded. Alternatively, the signal lines 114*a* and 114*e* are both grounded. Alternatively, the signal lines 114*a* and 1 14*e* are both connected to the signal source 120. This is not limited in this embodiment of this application.

Figure 10:
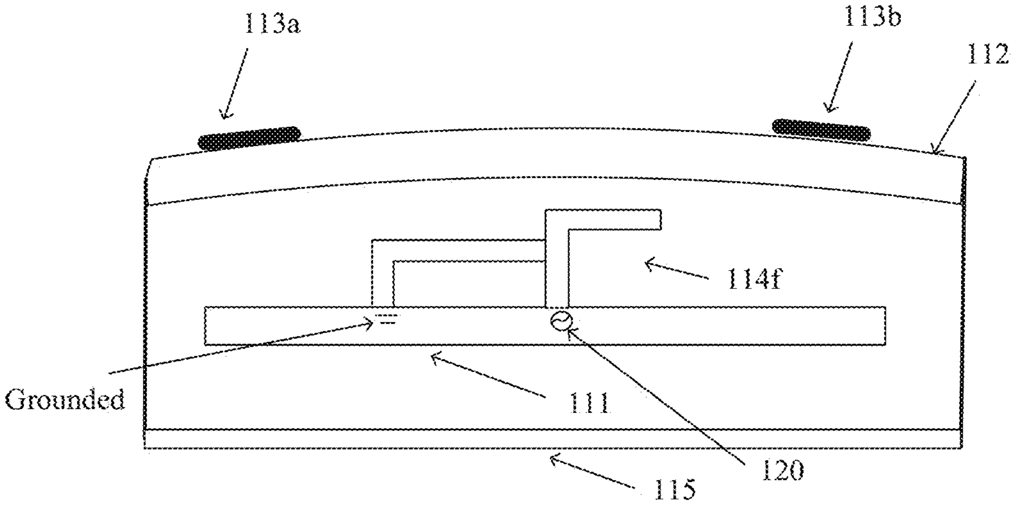
FIG. 10 is a side view of a schematic structure of a signal line in a still further example according to this application.

For another example, a signal line 114*f* shown in FIG. 10 is another possible shape of a signal line. One end of the signal line 114*f* is grounded, and the other end of signal line 114*f* is connected to a signal source 120. Optionally, both ends of the signal line 114*f* may be grounded, and the signal source 120 may transmit a generated signal to the signal line 114*f* through a circuit board 111. Alternatively, both ends of the signal line 114*f* may be connected to the signal source 120.

It should be understood that the several shapes, positions, and quantities of signal lines shown in FIG. 1 to FIG. 10 are merely examples. In this embodiment of this application, a signal line may alternatively be in another shape, and a quantity of signal lines on the circuit board may alternatively be another number. The shapes, quantities, and positions of signal lines shown in FIG. 1 to FIG. 10 should not constitute any limitation to the embodiments of this application.

In the following descriptions, as an example for illustration, the metal line 113 includes 113*a* and 113*b*, and the signal line 114 includes 114*a* and 114*b*.

As shown in FIG. 1 to FIG. 10, a gap (an interval) exists between the metal line 113 and the signal line 114 (for example, 114*a* and 114*b*). For example, an interval exists between the metal line 113*a* and the signal line 114*a*, and an interval exists between the metal line 113*b* and the signal line 114*b*. In other words, the metal line 113 and the signal line 114 are neither in direct contact nor in indirect contact through another connection part. The signal line 114 and the metal line 113 feed in, through the gap in a coupling mariner, an electromagnetic wave signal received by the metal line 113. A feed-in manner between the metal line 113 and the signal line 114 is feed-in in a coupling manner, instead of a direct feed-in manner. For example, a feed-in manner between the metal line 113*a* and the signal line 114*a* is feed-in in a coupling manner, and a feed-in manner between the metal line 113*b* and the signal line 114*b* is also feed-in in a coupling manner. In a direct feed-in manner, a metal line and a signal line are in direct contact or in indirect contact by using another connection part (this is a direct electrical connection manner). Specifically, the signal line 114 feeds, into the metal line 113 in a coupling manner, an electromagnetic wave signal generated by the circuit board 111; and the metal line 113 transmits the electromagnetic wave signal. Alternatively, the metal line 113 receives an electromagnetic wave signal sent by another device, and feeds the electromagnetic wave signal into the signal line 114 in a coupling manner; and the signal line 114 transfers the electromagnetic wave signal to the circuit board 111.

The metal line 113 is disposed on the outer surface of the housing 112 or embedded in the housing 112. Therefore, the feed-in in a coupling manner can enable the terminal device to accurately receive and send an electromagnetic wave signal, and avoid instability problems such as loose contact caused by a direct feed-in manner, thereby further improving the operating efficiency and quality of the antenna of the terminal device.

Figure 11:
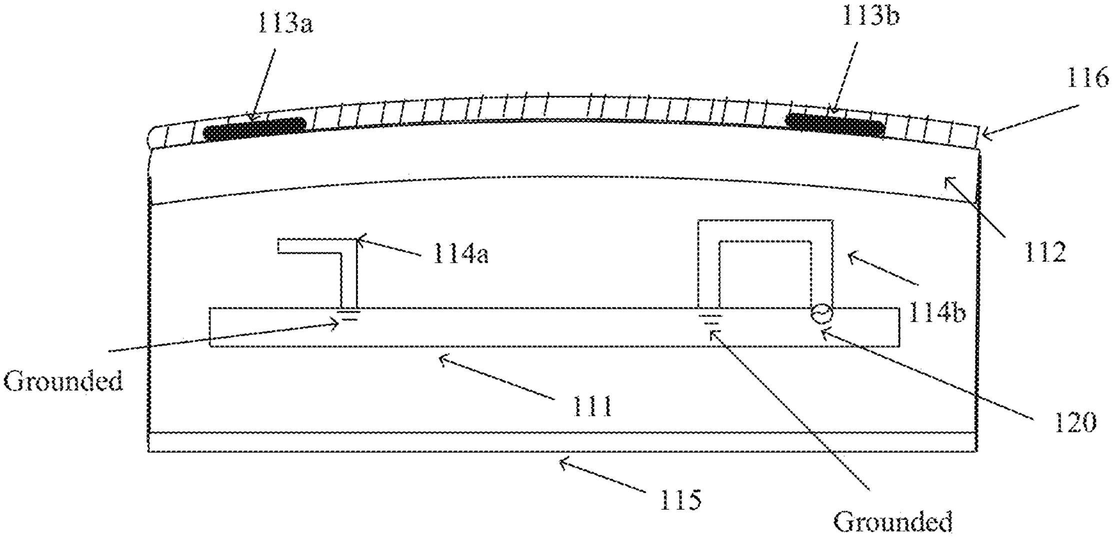
FIG. 11 is a side view of a schematic structure in which a protective film is disposed on an outer surface of a housing in an example according to this application.
Figure 12:
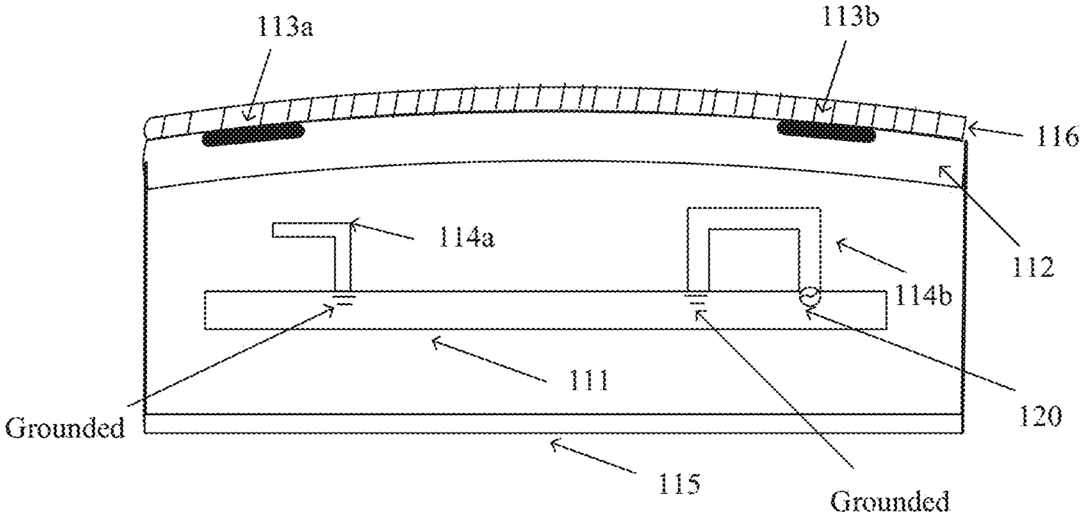
FIG. 12 is a side view of a schematic structure in which a protective film is disposed on an outer surface of a housing in another example according to this application.

In this embodiment of this application, when the metal line 113 is disposed on the outer surface of the housing 112, for example, as shown in FIG. 11 and FIG. 12. Where FIG. 11 and FIG. 12 are side views of a schematic structure in which a protective film 116 is disposed on the outer surface of the housing 112, a protective film (protective layer) 116 is disposed on the outer surface of the housing 112, or a protective film 116 is disposed on a surface of the metal line 113. The protective film 116 is configured to prevent problems such as wear and peel-off of the metal line 113, thereby improving stability and a service life of the metal line 113.

As shown in FIG. 11 and FIG. 12, the protective film 116 is disposed on the outer surface of the entire housing 112.

Optionally, the protective film may alternatively be disposed only on the surface of the metal line 113, but not on a region on which no metal line is arranged. This is not limited in this embodiment of this application.

In this embodiment of this application, a material of the protective film 116 may be a polymer material, a ceramic material, or the like. The material of the protective film 116 is not limited in this application, provided that the material can protect the metal line 113 against wear and the like and does not affect the metal line 113 in sending and receiving an electromagnetic wave signal.

The protective film that protects the metal line is disposed on the metal line. In this way, problems such as wear and peel-off of the metal line can be prevented, further improving durability and use quality of the metal line and extending the service life of the metal line.

In this embodiment of this application, when the metal line 113 is embedded in the housing 112, the housing 112 may include a plurality of insulation layers, and the metal line 113 is embedded between any two of the plurality of insulation layers.

As an example for illustration, the housing 112 includes two insulation layers.

Figure 13:
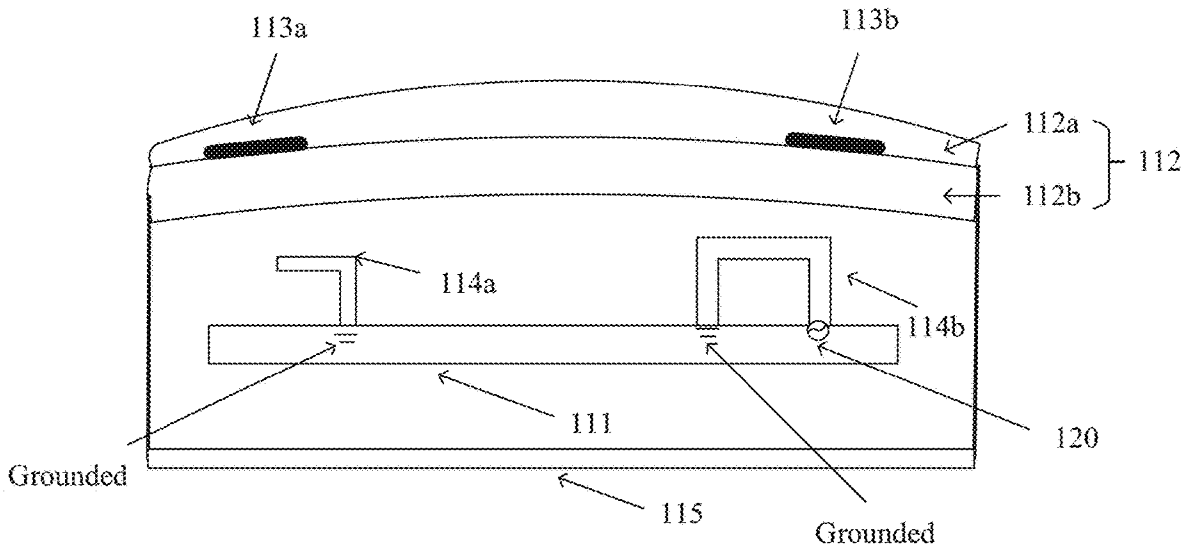
FIG. 13 is a side view of a schematic structure in which a housing includes two insulation layers in an example according to this application.

FIG. 13 is a side view of a schematic structure in which a housing 112 includes two insulation layers. As shown in FIG. 13, the two insulation layers are 112*a* and 112*b*. 112*a* and 112*b* form the housing 112. Metal lines 113*a* and 113*b* are disposed on a contact surface of the insulation layer 112*a* and the insulation layer 112*b*. Specifically, the metal lines 113*a* and 113*b* may be fixed onto the insulation layer 112*b* through bonding or etching, and then the insulation layer 112*b* and the insulation layer 112*a* are combined together as a whole to form the complete housing 112. In other words, the metal lines 113*a* and 113*b* are sandwiched between the insulation layer 112*b* and the insulation layer 112*a*. In this way, problems such as wear and peel-off of the metal line can be prevented, further improving the durability and use quality of the metal line and extending the service life of the metal line.

Optionally, a thickness of the insulation layer 112*b* and a thickness of the insulation layer 112*a* may be the same, for example, both are 0.3 mm. Alternatively, a thickness of the insulation layer 112*b* and a thickness of the insulation layer 112*a* may be different.

In some possible implementations, the two insulation layers are both plastic layers, or the two insulation layers are both glass layers, or one of the two insulation layers is a glass layer and the other layer is a plastic layer; and the metal line is embedded between the two insulation layers.

Figure 14:
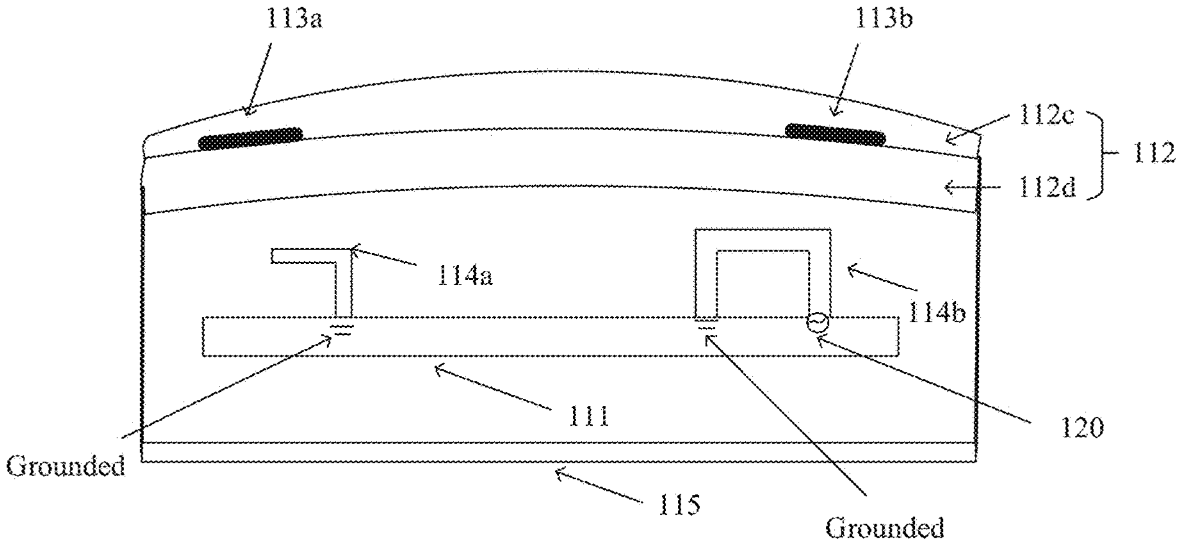
FIG. 14 is a side view of a schematic structure in which a housing includes two insulation layers in an example according to this application.
Figure 15:
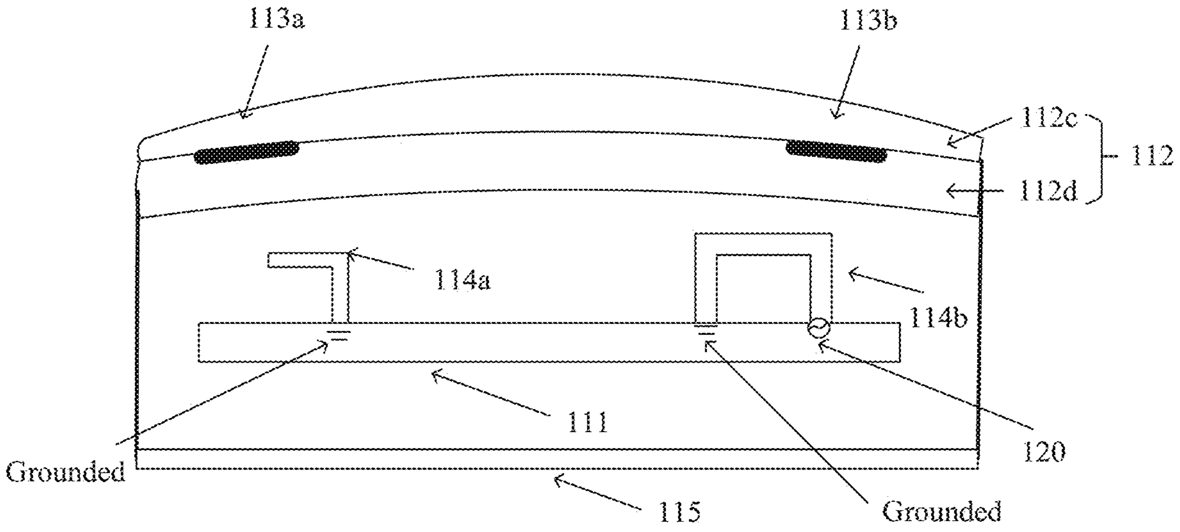
FIG. 15 is a side view of a schematic structure in which a housing includes two insulation layers in an example according to this application.

FIG. 14 is a side view of a schematic structure in which a housing 112 includes two insulation layers. As shown in FIG. 14, the two insulation layers are 112*c* and 112*d*. The insulation layer 112*c* may be a glass layer, and the insulation layer 112*d* may be a polyethylene terephthalate (polyethylene terephthalate, PET) plastic layer. Metal lines 113*a* and 113*b* are disposed on a contact surface of the insulation layer 112*c* and the insulation layer 112*d*. As shown in FIG. 14, the metal lines 113*a* and 113*b* are fixed onto the insulation layer 112*d* through printing, bonding, metal coating, or the like, and then the insulation layer 112*c* and the insulation layer 112*d* are combined together as a whole to form the complete housing 112. Optionally, FIG. 15 illustrates that metal lines 113*a* and 113*b* are disposed on an insulation layer 112*d* through etching or the like, and then an insulation layer 112*c* and the insulation layer 112*d* are combined together to form a complete housing 112. Optionally, alternatively, the metal lines 113*a* and 113*b* may be disposed on the insulation layer 112*c* through etching or the like, and then the insulation layer 112*c* and the insulation layer 112*d* are combined together as a whole to form a complete housing 112. In this embodiment of this application, a specific manner of disposing the metal line between any two of the plurality of insulation layers is not limited.

Optionally, a thickness of the insulation layer 112*c* and a thickness of the insulation layer 112*d* may be the same, for example, both are 0.35 mm. Alternatively, a thickness of the insulation layer 112*c* and a thickness of the insulation layer 112*d* may be another value.

Alternatively, a thickness of the insulation layer 112*c* and a thickness of the insulation layer 112*d* may be different.

Optionally, the insulation layer 112*c* may be a PET plastic layer, and the insulation layer 112*d* may be a glass layer.

Optionally, the insulation layer 112*c* or 112*d* may be an insulation layer formed by (or composed of) a plurality of insulation layers as a whole. For example, the insulation layer 112*c* is an insulation layer formed by a plurality of glass layers as a whole.

Optionally, materials of the two insulation layers may be the same or may be different. Materials of the insulation layer 112*c* and the insulation layer 112*d* may alternatively be other materials. For example, the insulation layer 112*d* may alternatively be polyethylene (Polyethylene, PE) plastic, polypropylene (Polypropylene, PP) plastic, or polyvinyl chloride (Polyvinyl Chloride, PVC). This is not limited in this embodiment of this application.

In this embodiment of this application, a material of each of the plurality of insulation layers is not limited. In addition, a material of each of the plurality of insulation layers may be the same as or different from a material of another insulation layer of the plurality of insulation layers. For example, in the foregoing example, the insulation layer 112*c* may alternatively be a resin material (for example, epoxy resin), and the insulation layer 112*d* may alternatively be a rubber material (for example, silicone rubber or fluororubber). Alternatively, the insulation layer 112*c* may be a fiber material (for example, polyester or aramid fiber), and the insulation layer 112*d* may be a coating (for example, polyurethane) or the like. This is not limited in this embodiment of this application.

In this embodiment of this application, a thickness of each of the plurality of insulation layers is not limited. A thickness of each of the plurality of insulation layers may be the same as or different from a thickness of another insulation layer of the plurality of insulation layers. This is not limited in this embodiment of this application.

Optionally, in some embodiments of this application, a polyvinyl butyral (PVB) layer may further exist between the insulation layer 112*c* and the insulation layer 112*d* or between the insulation layer 112*a* and the insulation layer 112*b*. In the following descriptions, as an example for illustration, the PVB layer (which may also be referred to as a PVB intermediate film) is disposed between the insulation layer 112*c* and the insulation layer 112*d*. In other words, the PVB layer is disposed between a glass layer and a PET plastic layer.

The metal lines 113*a* and 113*b* may be fixed onto the insulation layer 112*d* (the PET plastic layer) through printing, bonding, metal coating, or the like, and then the PVB layer, the insulation layer 112*c* (the glass layer), and the insulation layer 112*d* onto which the metal lines are fixed are combined together as a whole to form the complete housing 112.

Optionally, the metal lines 113*a* and 113*b* may be fixed onto the insulation layer 112*d* (the PET plastic layer) through etching or the like, and then the PVB layer, the insulation layer 112*c* (the glass layer), and the insulation layer 112*d* onto which the metal lines are fixed are combined together as a whole to form the complete housing 112.

Optionally, alternatively, the metal lines 113*a* and 113*b* may be fixed onto the PVB layer through printing, bonding, metal coating, etching, or the like, and then the PVB layer onto which the metal lines are fixed, the insulation layer 112*c,* and the insulation layer 112*d* are combined together as a whole to form the complete housing 112.

Optionally, alternatively, the metal lines 113*a* and 113*b* may be fixed onto the insulation layer 112*c* through printing, bonding, metal coating, etching, or the like, and then the insulation layer 112*c* onto which the metal lines are fixed, the PVB layer, and the insulation layer 112*d* are combined together as a whole to form the complete housing 112.

It should be understood that a PVB layer may alternatively be disposed between two glass layers, the metal line is then disposed on the PVB layer, and finally the two glass layers and the PVB layer on which the metal line is disposed are combined together to form the housing 112. Alternatively, the metal line may be disposed on any one of the two glass layers, and finally the two glass layers and the PVB layer are combined together to form the housing 112.

It should be further understood that, in this embodiment of this application, a thickness of the PVB layer is not limited. For example, the thickness of the PVB layer may range from 10 to 100 micrometers (μm). Certainly, the thickness of the PVB layer may alternatively be another value. This is not limited in this embodiment of this application.

It should be further understood that, in this embodiment of this application, except disposing a PVB layer between two insulation layers, an intermediate layer or an intermediate film made of another material may alternatively be disposed, provided that the intermediate layer or intermediate film can combine the two insulation layers more stably or firmly. This is not limited in this embodiment of this application.

It should be understood that the housing 112 may include more insulation layers. For example, when the housing 112 includes three or four insulation layers, the metal line 113 may be disposed between any two insulation layers. When there are a plurality of metal lines, the plurality of metal lines may be located between the same two insulation layers, or may be located between different combinations of two insulation layers. This is not limited in this embodiment of this application.

In the embodiments of this application, the housing 112 may be made of a glass material. In other words, the housing 112 may be a glass housing. When the glass housing includes a plurality of glass layers, the metal line 113 may be disposed between any two glass layers. When the plurality of glass layers are combined together to form an entire glass housing, the plurality of glass layers may be combined in a heated melting manner. A temperature required for heated melting is between 120 degrees and 600 degrees. Finally, the plurality of glass layers are formed into one piece of glass, which finally become the glass housing. Alternatively, a plurality of layers of glass may be bonded by using common adhesive, to finally make the plurality of glass layers form into one piece of glass. For example, a thickness of the piece of glass finally formed by the plurality of glass layers may be 0.6 mm.

It should be understood that, in this embodiment of this application, except being made of the glass material, the housing 112 may alternatively be a polymer material. For example, the housing 112 may alternatively be a plastic housing, a rubber housing, or the like. In this embodiment of this application, an insulating material for preparing the housing 112 is not limited.

In the embodiments of this application, the metal line 113 may include any one of a metal mesh, silver paste, or a copper wire. Specifically, the metal line 113 may be implemented in a form of a metal mesh (metal mesh). Alternatively, the metal line 113 may be implemented by coating silver paste on the housing 112. Alternatively, the metal line 113 may be implemented by using a metallic copper wire.

Figure 16:
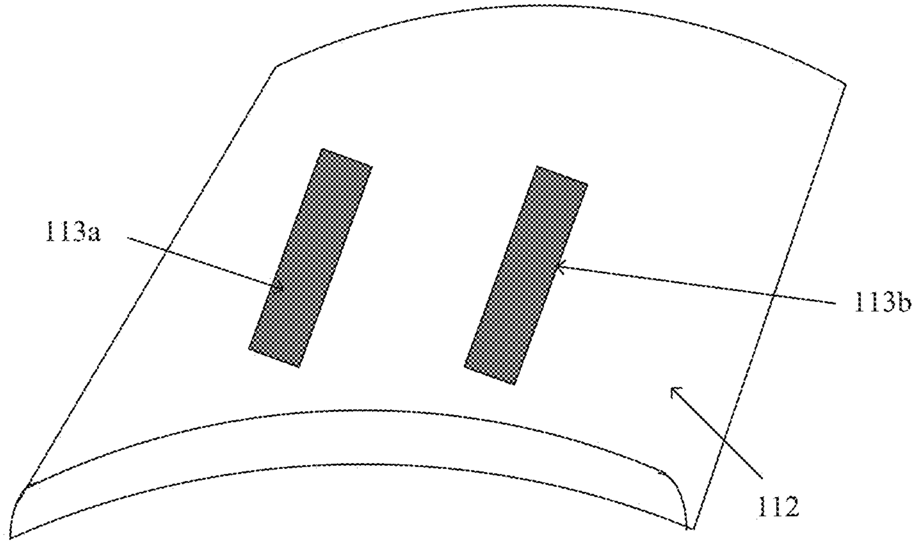
FIG. 16 is a schematic diagram of an example in which a metal line is implemented by using silver paste according to this application.

FIG. 16 is a schematic diagram illustrating that a metal line 113*a* and a metal line 113*b* are implemented by using silver paste. The metal line 113*a* and the metal line 113*b* may be formed by brush-coating silver paste on an outer surface of a housing 112, or the metal line 113*a* and the metal line 113*b* may be formed by brush-coating silver paste between any two of a plurality of insulation layers.

Figure 17:
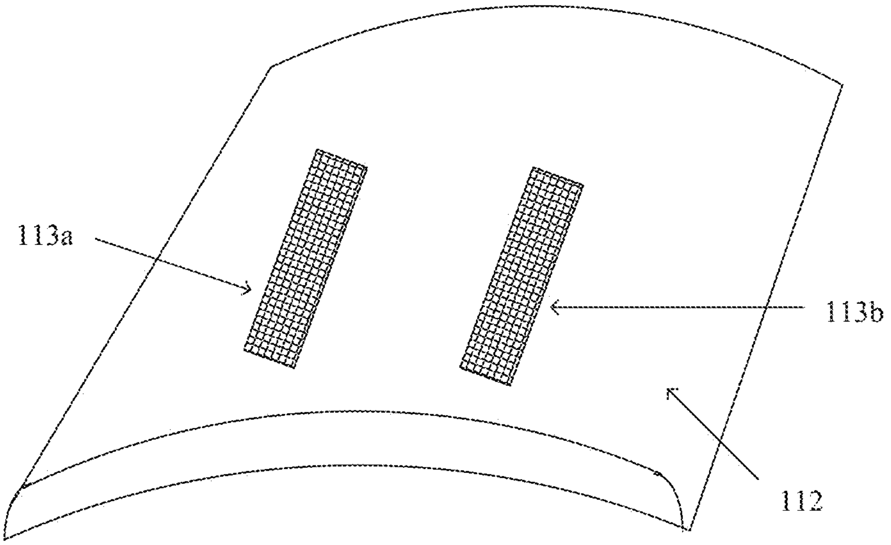
FIG. 17 is a schematic diagram of an example in which a metal line is implemented by using a metal mesh according to this application.

FIG. 17 is a schematic diagram illustrating that a metal line 113*a* and a metal line 113*b* are implemented by using a metal mesh. The metal mesh may be prepared first. Then, the metal mesh is fixed onto an outer surface of a housing 112 through bonding, welding, or the like, or the metal mesh is fixed between any two of a plurality of insulation layers, to form the metal line 113*a* and the metal line 113*b.*

In this embodiment of this application, the metal line 113 may alternatively be implemented in another form. For example, the metal line 113 may be implemented in a form of a metal sheet, or implemented through LDS etching, light exposure, or the like. This is not limited in this embodiment of this application.

In this embodiment of this application, a plurality of metal lines may be implemented in different manners. For example, the metal line 113*a* may be implemented by using silver paste, the metal line 113*b* is implemented by using a metal mesh, and the like. This is not limited in this embodiment of this application.

In this embodiment of this application, a specific metallic material of the metal line 113 is not limited. For example, the metal line 113 may be made of a metallic material such as copper, aluminum, or iron. The plurality of metal lines may also be made of different metallic materials. This is not limited in this embodiment of this application.

Optionally, in this embodiment of this application, a very thin line width, which is invisible to naked eyes, can be achieved for the metal line 113 (for example, the line width is approximately 0.002 mm), making a line formed by the metal line 113 a transparent line (a translucent line). In other words, the metal line is translucent (transparent). For example, the line formed by the metal line 113 is made a transparent line by using a metal mesh or by coating with metal paste. Optionally, a transmittance of the metal line 113 is Y, and a value range of Y is $50\% \leq Y \leq 95\%$.

In this embodiment of this application, the plurality of metal lines may include some translucent metal lines. Transmittances of the plurality of translucent metal lines may be different. This is not limited in this embodiment of this application.

Optionally, in this embodiment of this application, when the metal line 113 is implemented by using a metal mesh and a material of the metal mesh is not copper, a metal layer may be coated on the metal mesh to reduce impedance of the metal mesh. For example, copper may be coated to reduce impedance of the metal line. Further, nickel may be coated on the metal layer to prevent the metal line from oxiding, corroding, and the like. Certainly, when the metal mesh is implemented in another form (for example, a metal sheet or a metal wire), copper may also be coated on the metal line to reduce impedance of the metal line. Further, nickel may also be coated on the metal line that is coated with copper, to prevent the metal line from oxiding, corroding, and the like.

In this embodiment of this application, when the metal line 113 is disposed on the outer surface of the housing 112, a protective film 116 is further disposed on the outer surface of the housing 112 or the surface of the metal line 113. The protective film 116 may be formed on the outer surface of the housing 112 or the surface of the metal line 113 in the following several manners:

1. Physical vapor deposition (physical vapor deposition, PVD): Substance transfer is implemented by using a physical process to spray particles of a protective film material on the outer surface of the housing 112 or the surface of the metal line 113. Basic methods of PVD includes vacuum evaporation, sputtering, ion plating (hollow cathode ion plating, hot cathode ion plating, arc ion plating, activated reactive ion plating, radio frequency ion plating, and direct current discharge ion plating), and the like.

2. Chemical vapor deposition: This is a method for producing a film by performing chemical reaction on the outer surface of the housing 112 or the surface of the metal line 113 by using one or more gaseous compounds or simple substances that include elements of a protective film material.

3. Ceramic coating: Ceramic coating forms a protective film by spaying ceramic powder or particles on the outer surface of the housing 112 or the surface of the metal line 113. A coating (the protective film) formed by ceramic coating may be transparent or colored, provided that the coating can protect the metal line.

4. Hard coating solution: A hard coating solution layer (a protective film) is formed on the outer surface of the housing 112 or the surface of the metal line 113 through spraying, curtain coating, dip coating, or the like. The hard coating solution layer is made of a silicone hard coating solution. A hardening condition include ultraviolet (ultraviolet rays, UV) exposure, moisture hardening, or the like. The hard coating solution layer may be transparent or colored.

5. Protective film or decorative film: A layer of film is attached to the outer surface of the housing 112 or the surface of the metal line 113. A material of the film may be resin, glass, or the like, provided that the film can protect the metal line 113.

In this embodiment of this application, in addition to the foregoing manners for disposing the protective film 116 on the outer surface of the housing 112 or the surface of the metal line 113, another feasible manner or technology may alternatively be used to dispose a protective film or coating on the outer surface of the housing 112 or the surface of the metal line 113, provided that the protective film or coating can prevent problems such as wear and peel-off of the metal line. This is not limited in this embodiment of this application.

Figure 18:
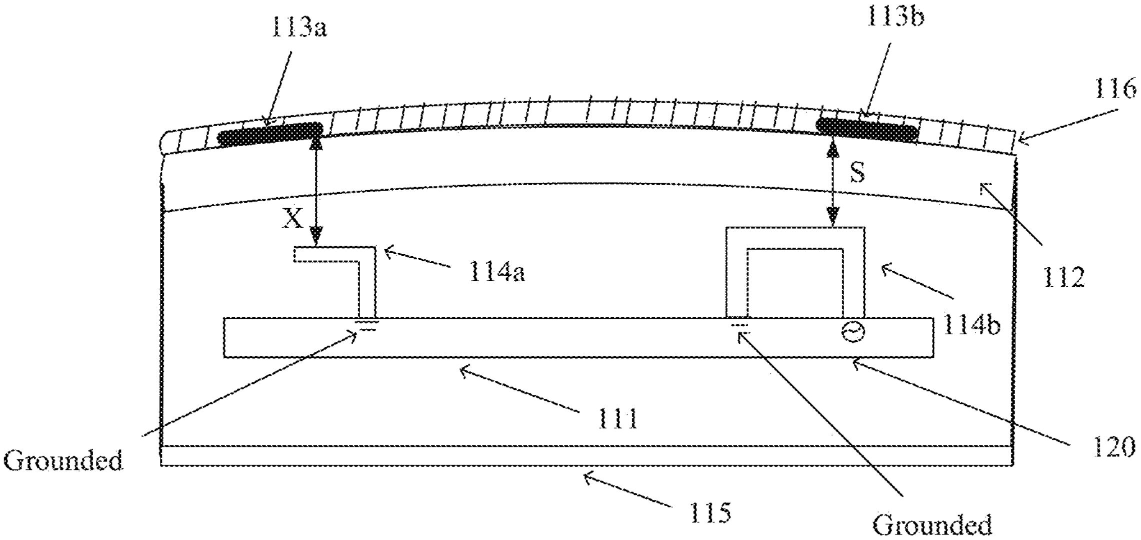
FIG. 18 is a schematic diagram of a distance between a metal line and a signal line in an example according to this application.

In this embodiment of this application, a gap (an interval) exists between the metal line 113 and the signal line 114. Therefore, a distance exists between the metal line 113 and the signal line 114. As shown in FIG. 18, metal lines 113*a* and 113*b* are disposed on an outer surface of a housing 112, an interval exists between the metal line 113*a* and a signal line 114*a*, and an interval exists between the metal line 113*b* and a signal line 114*b*. A distance between the metal line 113*a* and the signal line 114*a* is X, and a distance between the metal line 113*a* and the signal line 114*a* is S. In other words, one signal line corresponds to one metal line, or one signal line goes with one metal line. A feed-in manner between the metal line 113 and the signal line 114 is feed-in in a coupling manner. Optionally, a value range of X is 0.1 mm≤X≤5 mm, and a value range of S is 0.1 mm≤X≤5 mm.

Figure 19:
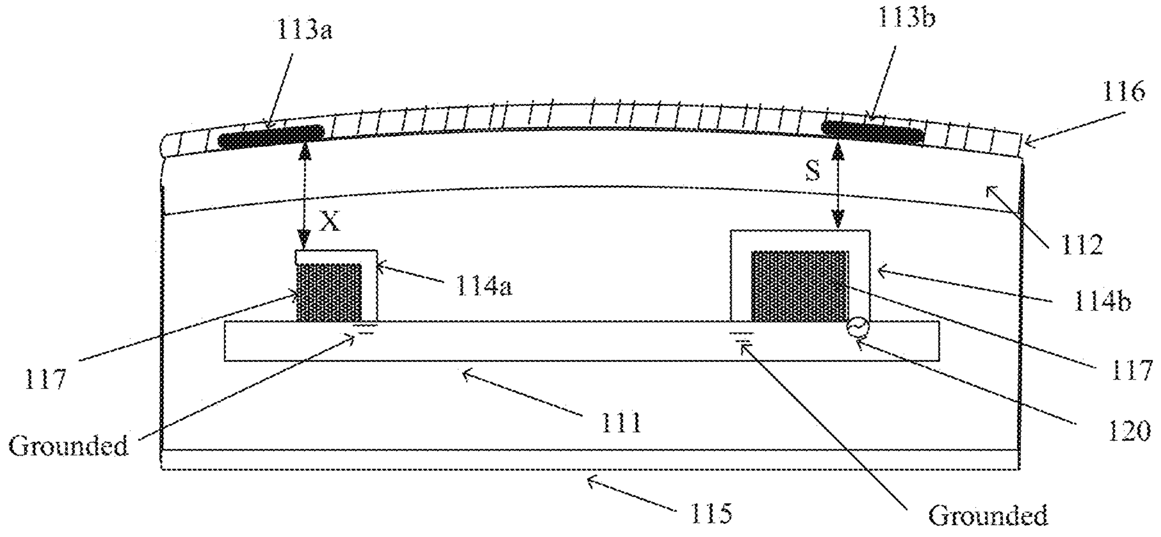
FIG. 19 is a schematic diagram of a distance between a metal line and a signal line in another example according to this application.

FIG. 19 is a schematic diagram of another signal line. Different from those in FIG. 18, signal lines 114*a* and 114*b* in FIG. 19 are disposed on a support 117. The support 117 is fixed onto a circuit board 111, and the support 117 is configured to support and fix the signal line 114. However, the signal line 114 shown in FIG. 18 is directly fixed onto a circuit board and a structure shown in FIG. 18 does not include a support 117. A distance between a metal line 113*a* and the signal line 114*a* is X, and a distance between a metal line 113*a* and the signal line 114*a* is S. Optionally, a value range of X is 0.1 mm≤X≤5 mm, and a value range of S is 0.1 mm≤X≤5 mm.

Figure 20:
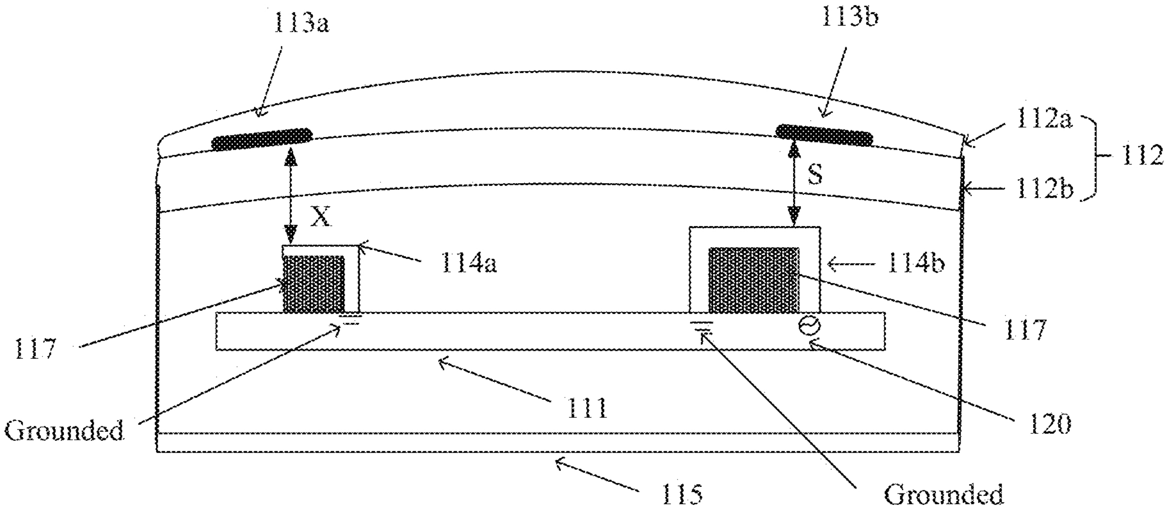
FIG. 20 is a schematic diagram of a distance between a metal line and a signal line in still another example according to this application.

FIG. 20 is a schematic diagram of a signal line when a metal line 113 is disposed between two insulation layers. As shown in FIG. 20, metal lines 113*a* and 113*b* are disposed between two insulation layers 112*a* and 112*b*. A distance between each metal line 113 and the signal line 114 is X. In other words, one signal line corresponds to one metal line, or one signal line goes with one metal line. A feed-in manner between the metal line 113 and the signal line 114 is feed-in in a coupling manner. A distance between the metal line 113*a* and a signal line 114*a* is X, and a distance between the metal line 113*a* and a signal line 114*a* is S. Optionally, a value range of X is 0.1 mm≤X≤5 mm, and a value range of S is 0.1 mm≤X≤5 mm.

Figure 21:
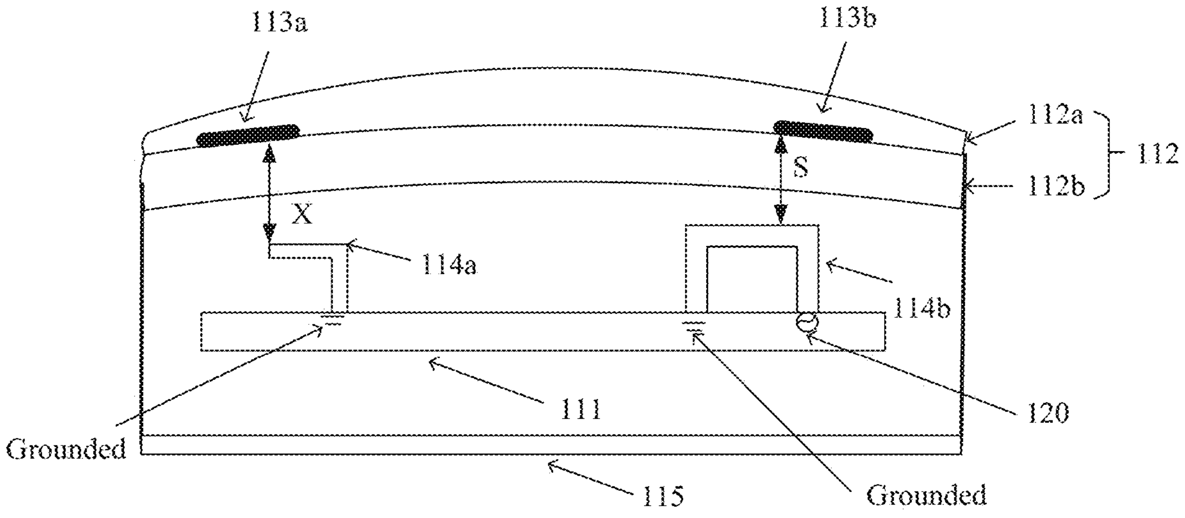
FIG. 21 is a schematic diagram of a distance between a metal line and a signal line in yet another example according to this application.

FIG. 21 is a schematic diagram of another signal line. Different from that in FIG. 20, the signal line 114 in FIG. 21 is disposed on a support 117. The support 117 is fixed onto a circuit board 111, and the support 117 is configured to support and fix the signal line 114. However, the signal line 114 shown in FIG. 20 is directly fixed onto a circuit board 111, and a structure shown in FIG. 20 does not include a support 117. A distance between a metal line 113*a* and a signal line 114*a* is X, and a distance between a metal line 113*a* and a signal line 114*a* is S. Optionally, a value range of X is 0.1 mm≤X≤5 mm, and a value range of S is 0.1 mm≤X≤5 mm.

It should be understood that, in this embodiment of this application, the distances X and S between the metal line 113 and the signal line 114 may alternatively be other values, provided that the distance between the metal line 113 and the signal line 114 is greater than 0. In other words, the metal line 113 and the signal line 114 are neither in direct contact nor in indirect contact through another connection part.

It should be further understood that the distance between the metal line 113 and the signal line 114 may be a minimum distance (a shortest distance) between the metal line 113 and the signal line 114. In other words, the metal line 113 is located at a position right above the signal line 114. For example, as shown in FIG. 18 to FIG. 21, a minimum distance between the metal line 113*a* and the signal line 114*a* may be a distance between the metal line 113*a* and the signal line 114*a* in a vertical direction. A minimum distance between the metal line 113*b* and the signal line 114*b* may also be a distance between the metal line 113*b* and the signal line 114*b* in the vertical direction. Certainly, a distance between the metal line 113*a* and the signal line 114*a* may alternatively be a distance between any position on the metal line 113*a* and any position on the signal line 114*a*, and a distance between the metal line 113*b* and the signal line 114*b* may also alternatively be a distance between any position on the metal line 113*b* and any position on the signal line 114*b*. This is not limited in this embodiment of this application.

Figure 22:
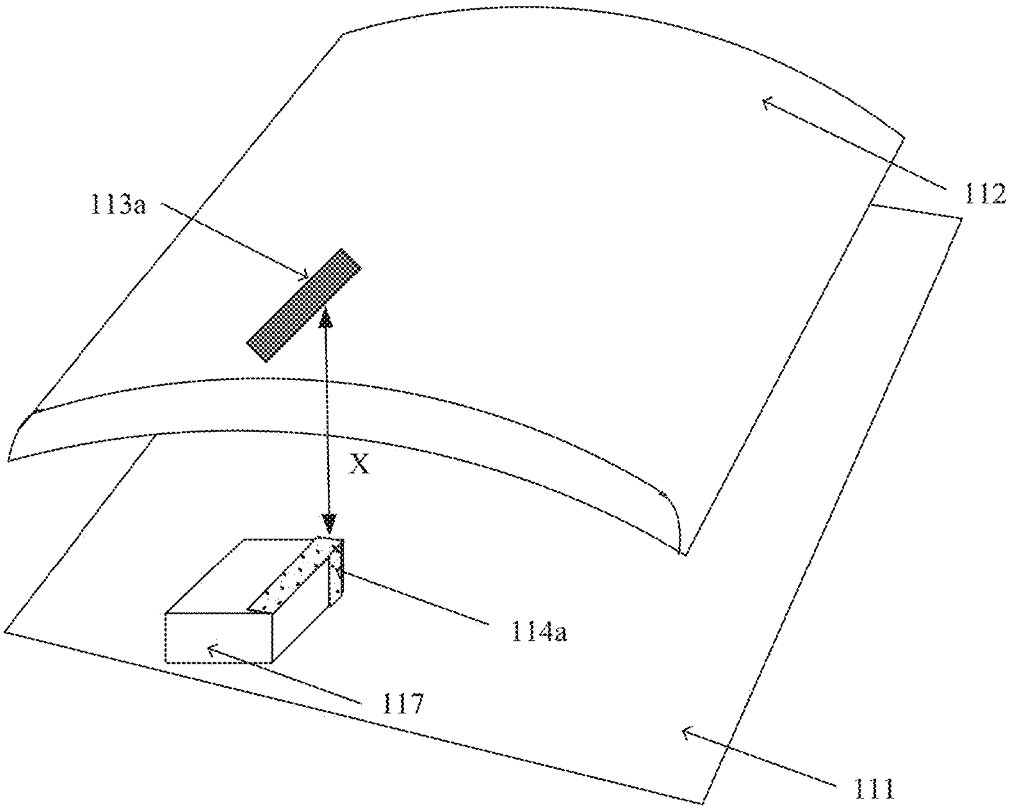
FIG. 22 is a schematic diagram of a relative position relationship between a metal line and a signal line in an example according to an embodiment of this application.

FIG. 22 is a schematic diagram of a relative position relationship between a metal line and a signal line in an example according to an embodiment of this application. A metal line 113*a* is disposed on an outer surface of a housing 112. A cuboid-shaped support 117 is fixed onto a circuit board 111. The support 117 is configured to support and fix a signal line 114*a*. The metal line 113*a* is located at a position right above the signal line 114*a*. A distance between the metal line 113*a* and the signal line 114*a* is X.

Optionally, a value range of X is 0.1 mm≤X≤5 mm.

Figure 23:
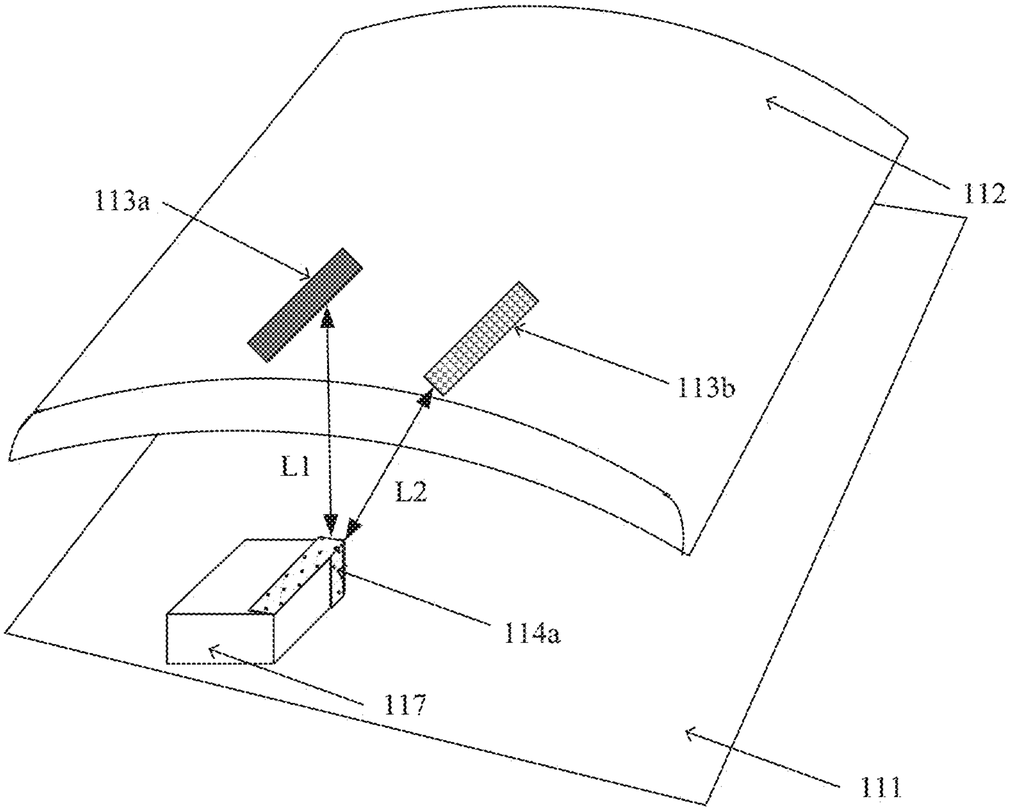
FIG. 23 is a schematic diagram of an example in which a signal line goes with two metal lines according to an embodiment of this application.

FIG. 23 shows a case in which one signal line 114 goes with one metal line 113. In this embodiment of this application, one signal line may go with a plurality of metal lines. For example, FIG. 23 shows a case in which a signal line 114*a* goes with two metal lines. The two metal lines 113 may be 113*a* and 113*b*. Distances from the metal lines 113*a* and 113*b* to the signal line 114*a* are respectively L1 and L2. Optionally, a value range of L1 is 0.1 mm≤L1≤5 mm, and/or a value range of L2 is 0.1 mm≤L2≤5 mm. Certainly, L1 and L2 may alternatively be other values, provided that values of L1 and L2 are greater than 0.

Optionally, in this embodiment of this application, the housing 112 may alternatively be made of a ceramic material. A metal line may be embedded on an outer surface of the ceramic housing 112 (which may alternatively be referred to as a ceramic cover). Alternatively, the metal line may be embedded in the housing 112. Optionally, the metal line may be made of an inorganic conductive material, and the metal line may be used as an antenna radiator of the terminal device to complete a function of an antenna. Optionally, an outer surface of the metal line may be overlaid with a layer of glass glaze, to protect the metal line and prevent wear of the metal line.

Optionally, in this embodiment of this application, the ceramic material may be any type of ceramics such as zirconium oxide, aluminum oxide, silicon carbide, silicon nitride, aluminum nitride, or boron carbide. It should be understood that the housing 112 may alternatively be prepared by using another ceramic material. This is not limited in this embodiment of this application.

Optionally, in this embodiment of this application, the metal line may be made of conductive silver paste. It should be understood that, in this embodiment of this application, the metal line may alternatively be made of one or more other types of sintered conductive slurry. This is not limited in this application.

Optionally, in this embodiment of this application, the glass glaze overlaid on the metal line may be transparent and colorless glaze, or may be subtransparent glaze, colored glaze, or the like. This is not limited in this application. It should be understood that, in addition to being overlaid with glass glaze (or a glass glaze layer), the metal line may be further overlaid with another material to protect the metal line. This is not limited in this embodiment of this application.

Figure 24:
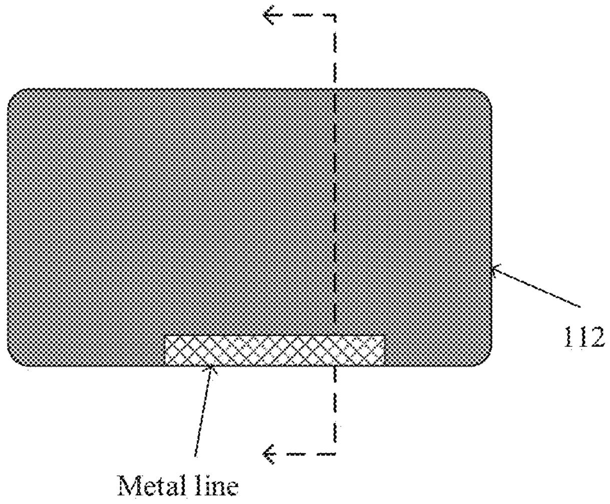
FIG. 24 is a schematic top view of an example in which a metal line is disposed on an outer surface of a ceramic housing according to an embodiment of this application.
Figure 25:
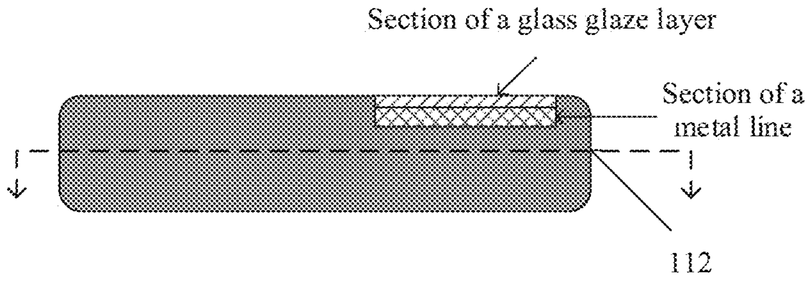
FIG. 25 is a schematic side view of a ceramic housing, where an outer surface of the ceramic housing is planer and a metal line is disposed on the outer surface of the ceramic housing, in an example according to an embodiment of this application.
Figure 26:
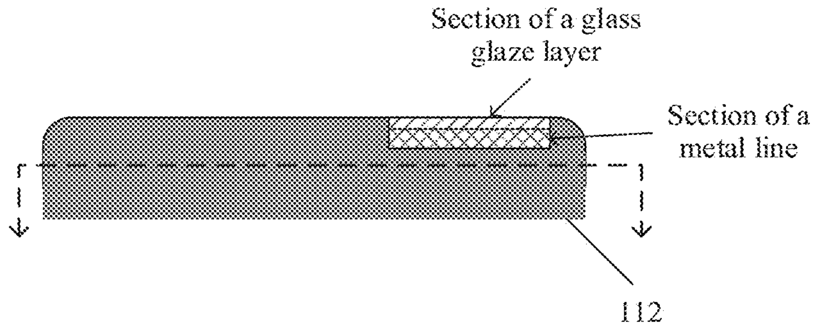
FIG. 26 is a schematic side view of a ceramic housing, where an outer surface of the ceramic housing is curved and a metal line is disposed on the outer surface of the ceramic housing, in an example according to an embodiment of this application.
Figure 27:
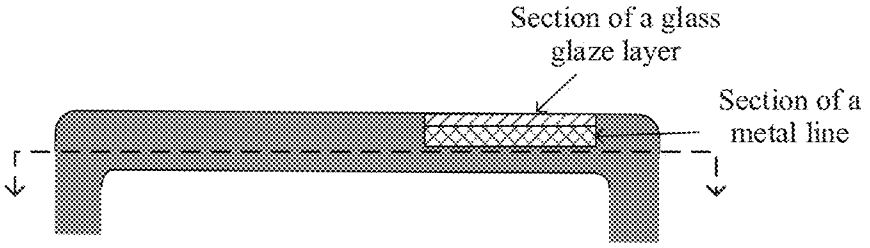
FIG. 27 is a schematic side view of a ceramic housing, where an outer surface of the ceramic housing is curved and a metal line is disposed on the outer surface of the ceramic housing, in another example according to an embodiment of this application.

Optionally, in this embodiment of this application, the outer surface of the ceramic housing 112 may be planar or may be curved. For example, FIG. 24 is a schematic top view of an example in which a metal line is disposed on an outer surface of a ceramic housing 112. A direction indicated by an arrow in FIG. 24 is a length direction of the ceramic housing 112. FIG. 25 is a schematic side view of a ceramic housing 112 in an example, where an outer surface of the ceramic housing 112 is planer and a metal line is disposed on the outer surface of the ceramic housing 112. FIG. 26 is a schematic side view of a ceramic housing 112, where an outer surface of the ceramic housing 112 is planer and a metal line is disposed on the outer surface of the ceramic housing 112. FIG. 27 is a schematic side view of a ceramic housing 112, where an outer surface of the ceramic housing 112 is curved and a metal line is disposed on the outer surface of the ceramic housing 112. A direction indicated by an arrow in each of FIG. 25 to FIG. 27 is a thickness direction of the ceramic housing 112. The metal line shown in FIG. 24 may be a sheet.

Figure 28:
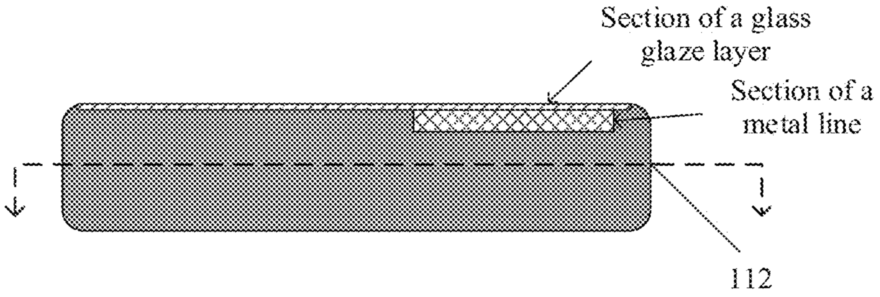
FIG. 28 is a schematic side view of a ceramic housing, where an outer surface of the ceramic housing is planer and a metal line is disposed on the outer surface of the ceramic housing, in an example according to an embodiment of this application.
Figure 29:
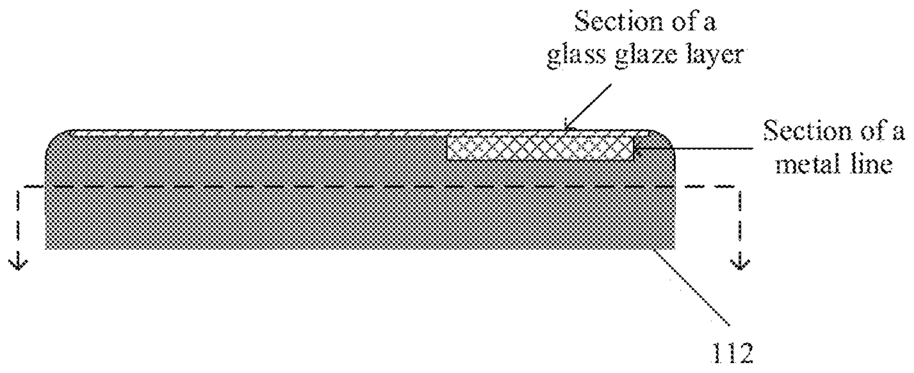
FIG. 29 is a schematic side view of a ceramic housing, where an outer surface of the ceramic housing is curved and a metal line is disposed on the outer surface of the ceramic housing, in an example according to an embodiment of this application.
Figure 30:
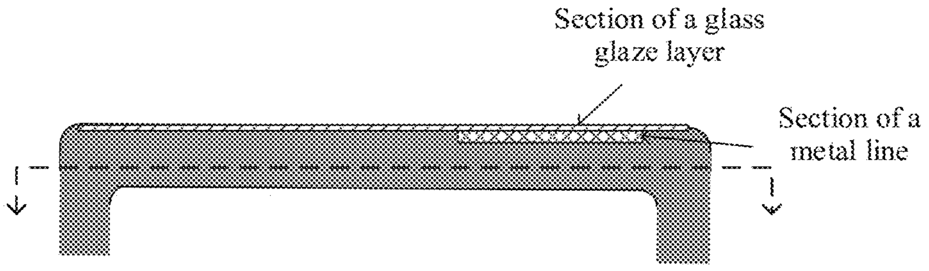
FIG. 30 is a schematic side view of a ceramic housing, where an outer surface of the ceramic housing is curved and a metal line is disposed on the outer surface of the ceramic housing, in another example according to an embodiment of this application.

It should be further understood that, in this embodiment of this application, not only a metal line region may be overlaid with glass glaze, but glass glaze may alternatively be disposed on the outer surface of the entire housing 112. For example, FIG. 25 to FIG. 27 are schematic diagrams illustrating that glass glaze is disposed on the metal line. FIG. 28 to FIG. 30 are schematic diagrams illustrating that glass glaze is disposed on the outer surface of the entire housing 112. In this embodiment of this application, a region overlaid with glass glaze on the outer surface of the housing 112 is not limited.

Optionally, a thickness of a glass glaze layer is not limited either in this embodiment of this application.

It should be understood that, in this embodiment of this application, the outer surface of the ceramic housing 112 may alternatively be in another shape. In addition, the metal line may be disposed on any region on the outer surface of the ceramic housing 112. This is not limited in this application.

Figure 31:
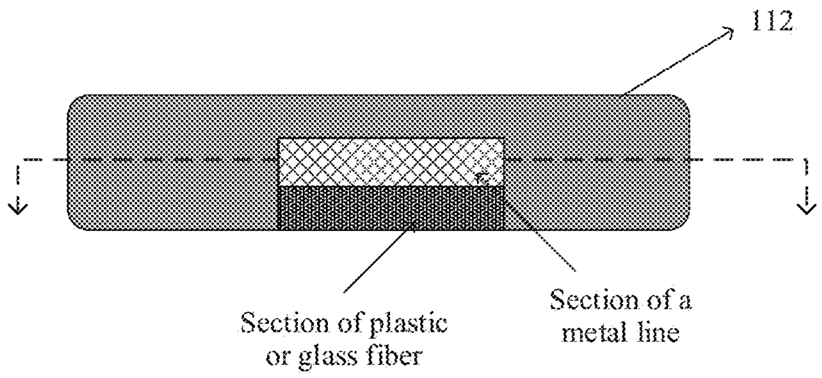
FIG. 31 is a schematic top view of another example in which a metal line is disposed on an outer surface of a ceramic housing according to an embodiment of this application.

Optionally, in some possible implementations of this application, a groove may be further provided inside the ceramic housing 112. The metal line is disposed in the groove. In addition, a layer of plastic, glass fiber, or another material may be further disposed on a surface of the metal line, to protect the metal line. For example, as shown in FIG. 31, in FIG. 31, a direction indicated by an arrow is a thickness direction of the ceramic housing 112.

Optionally, in an embodiment of this application, a ceramic housing in which a metal line is embedded may be obtained by using the following method:

First, a mould structure is designed based on a three-dimensional outline of the ceramic housing, and a biscuit of the ceramic housing is prepared by using a regular ceramic material forming technology such as dry pressing, tape casting, or injection. Then, the biscuit of the ceramic housing is sintered and densified under specific sintering parameters such as a specific temperature, atmosphere, and pressure, to obtain the ceramic housing; and the ceramic housing is processed in terms of a size, an outline, and the like by using a computer numerical control machine tool or through coarse grinding, polishing, or another manner. Then, a groove for accommodating the metal line is processed on an outer surface of the ceramic housing by using a computer numerical control machine tool or through laser marking or another manner based on requirements such as an outline, a size, and a position of the metal line. Conductive slurry is prepared by mixing an inorganic conductive material, solvent, and a polymeric additive such as adhesive; and the conductive slurry is coated in the groove through spraying, brush coating, or another manner, to form a portion that subsequently serves as the metal line. After the conductive slurry in the groove is dried, a glass glaze material is also coated in the groove in a regular glazing manner such as glaze spraying or glaze coating, and is overlaid on the conductive slurry. The ceramic housing coated with the conductive slurry and the glass glaze material is put under specific sintering parameters such as a specific temperature, atmosphere, and pressure, to sinter the conductive material and the glass glaze. Finally, a finished product of a ceramic cover in which an antenna is embedded is obtained after common processing of a mobile terminal cover, such as polishing and surface treatment for an appearance effect. Optionally, in this embodiment of this application, the surface treatment for an appearance effect includes one or more types of the following: coating, ink printing, film attachment, texturing, laser marking, or the like. Optionally, the surface treatment for an appearance effect may further include other processing manners.

Figure 32:
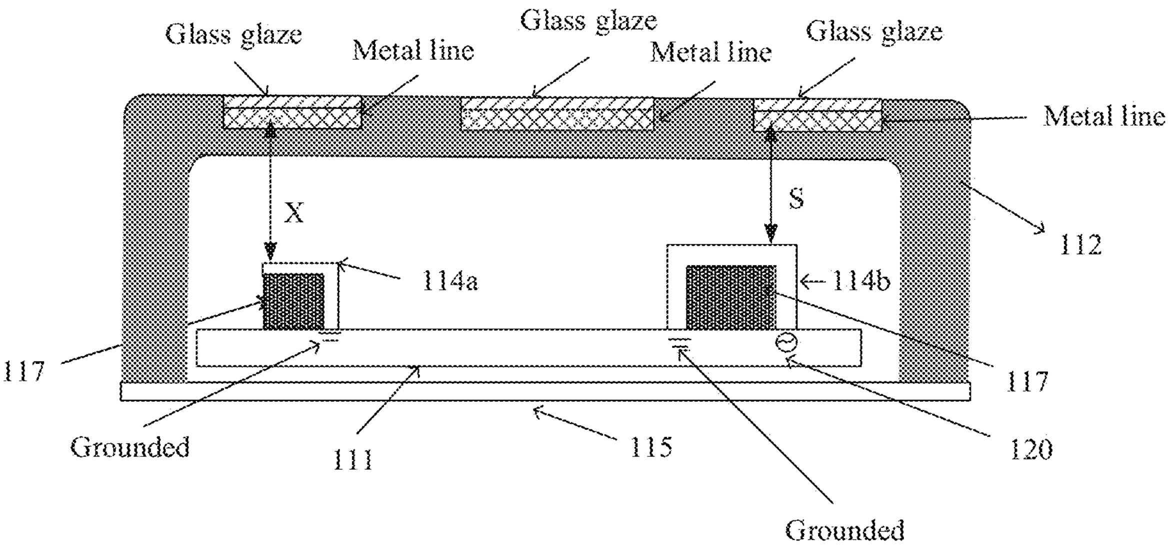
FIG. 32 is a schematic diagram of a distance between a metal line and a signal line in an example according to this application.

FIG. 32 is a schematic diagram of a relative position relationship between a metal line and a signal line in an example according to an embodiment of this application. The metal line shown in FIG. 32 is embedded in an outer surface of a ceramic housing 112, and glass glaze is disposed on the metal line. Signal lines 114_a_ and 114_b_ are each disposed on a support 117. The support 117 is fixed onto a circuit board 111, and the support 117 is configured to support and fix the signal line 114. A feed-in manner between the metal line and the signal line is feed-in in a coupling manner. Shortest distances from the metal line to the two signal lines 114_a_ and 114_b_ are respectively X and S. Optionally, a value range of X is 0.1 mm≤X≤5 mm, and a value range of S is 0.1 mm≤X≤5 mm.

Figure 33:
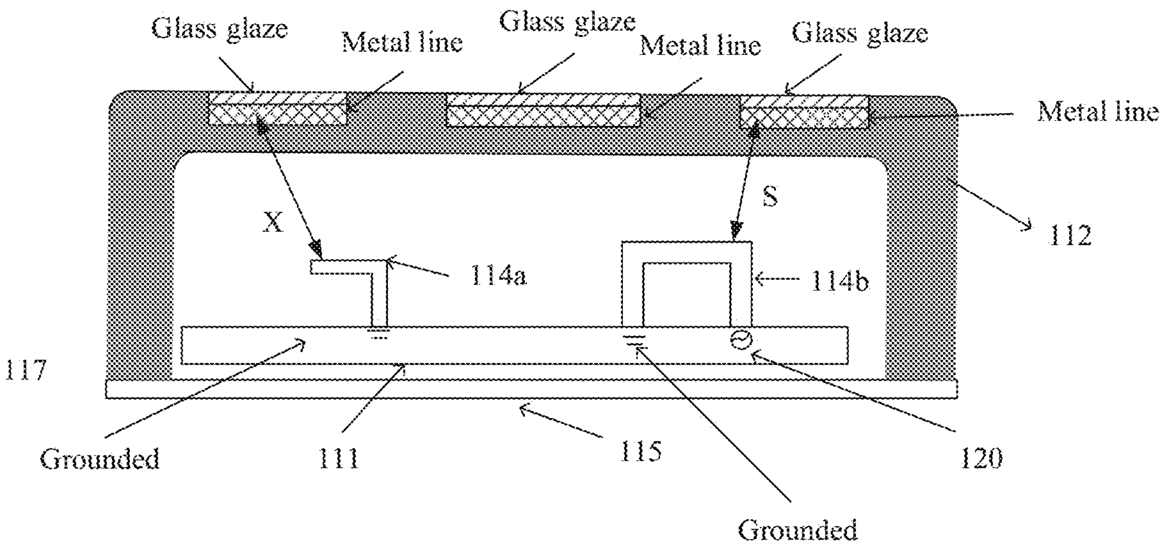
FIG. 33 is a schematic diagram of a distance between a metal line and a signal line in another example according to this application.

FIG. 33 is a schematic diagram of a relative position relationship between a metal line and a signal line in another example according to an embodiment of this application. Different from that in FIG. 32, a structure shown in FIG. 33 does not include a support 117. The signal line uses a form of a spring. The spring is fixed onto a circuit board 111. A feed-in manner between the metal line and the signal line is feed-in in a coupling manner. Shortest distances from the metal line to two signal lines 114_a_ and 114_b_ are respectively X and S. Optionally, a value range of X is 0.1 mm≤X≤5 mm, and a value range of S is 0.1 mm≤X≤5 mm.

It should be understood that, in this embodiment of this application, the distances X and S between the metal line and the signal line may alternatively be other values, provided that a distance between the metal line and the signal line is greater than 0. In other words, the metal line and the signal line are neither in direct contact nor in indirect contact through another connection part.

Optionally, in some other embodiments of this application, the housing 112 may alternatively be made of a ceramic material, and an antenna region on the ceramic housing 11 may include meshed lines. In other words, a shape of a metal line may be a meshed (mesh-shaped) line. The mesh-shaped metal line is embedded on an outer surface of the housing 112. The metal line may be made of an inorganic conductive material, and the metal line may be used as an antenna radiator of the terminal device to complete a function of an antenna. Optionally, an outer surface of the meshed metal line may be overlaid with a layer of glass glaze, to protect the metal line and prevent wear of the metal line.

Optionally, in this embodiment of this application, the meshed metal line may be prepared by using an inorganic conductive material, for example, conductive silver paste. It should be understood that, in this embodiment of this application, the metal line may alternatively be made of one or more other types of sintered conductive slurry. This is not limited in this application.

Figure 34:
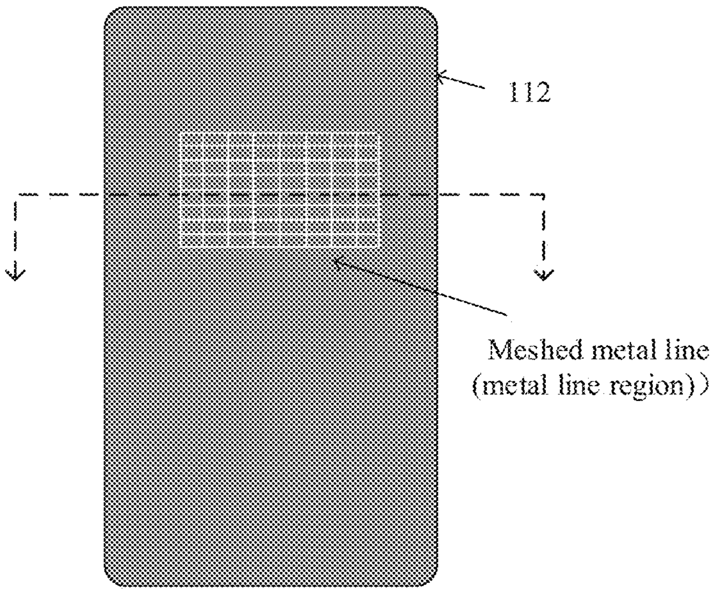
FIG. 34 is a schematic top view of an example in which a mesh-shaped metal line is disposed on an outer surface of a ceramic housing according to an embodiment of this application.
Figure 35:
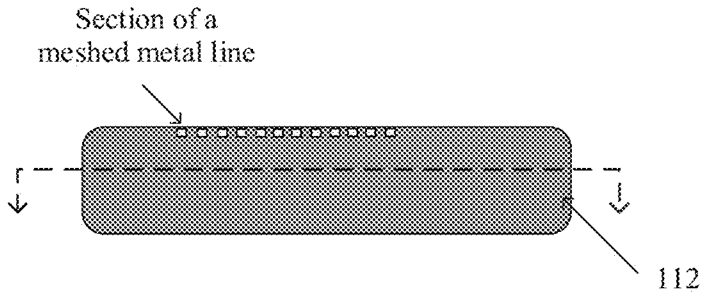
FIG. 35 is a schematic side view of a ceramic housing, where an outer surface of the ceramic housing is planer and a mesh-shaped metal line is disposed on the outer surface of the ceramic housing, in an example according to an embodiment of this application.
Figure 36:
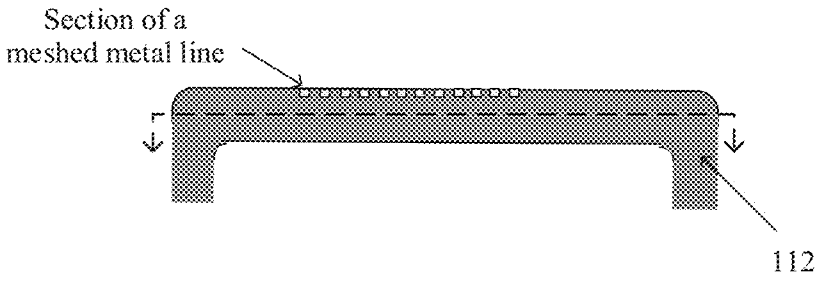
FIG. 36 is a schematic side view of a ceramic housing, where an outer surface of the ceramic housing is curved and a mesh-shaped metal line is disposed on the outer surface of the ceramic housing, in an example according to an embodiment of this application.
Figure 37:
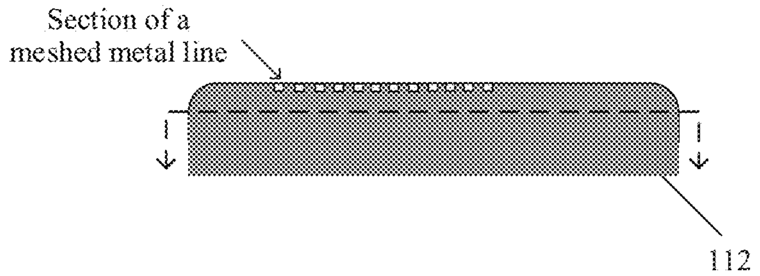
FIG. 37 is a schematic side view of a ceramic housing, where an outer surface of the ceramic housing is curved and a mesh-shaped metal line is disposed on the outer surface of the ceramic housing, in another example according to an embodiment of this application.

Optionally, in this embodiment of this application, the outer surface of the ceramic housing 112 may be planar or may be curved. For example, FIG. 34 is a schematic top view of an example in which a mesh-shaped metal line is disposed on an outer surface of a ceramic housing 112. A direction indicated by an arrow in FIG. 34 is a length direction of the ceramic housing 112. FIG. 35 is a schematic side view of a ceramic housing 112 in an example, where an outer surface of the ceramic housing 112 is planer and a mesh-shaped metal line is disposed on the outer surface of the ceramic housing 112. FIG. 36 is a schematic side view of a ceramic housing 112, where an outer surface of the ceramic housing 112 is planer and a mesh-shaped metal line is disposed on the outer surface of the ceramic housing 112. FIG. 37 is a schematic side view of a ceramic housing 112, where an outer surface of the ceramic housing 112 is curved and a mesh-shaped metal line is disposed on the outer surface of the ceramic housing 112. A direction indicated by an arrow in each of FIG. 35 to FIG. 37 is a thickness direction of the ceramic housing 112.

It should be understood that, in this embodiment of this application, the outer surface of the ceramic housing 112 may alternatively be in another shape. In addition, the metal line may be disposed on any region on the outer surface of the ceramic housing 112. This is not limited in this application.

It should be understood that, in this embodiment of this application, an outline of a region (which may also be referred to be an antenna region) on which the mesh-shaped metal line is disposed may be a circle, a square, a rectangle, an oval, a racetrack shape, a triangle, an irregular figure, or the like. The metal line is mesh-shaped and has a specific thickness. Therefore, a three-dimensional outline of the metal line may be a sphere, a cube, a cuboid, a cylinder, an ellipsoid, a cone, or an irregular special-shaped body. For example, a three-dimensional outline of the metal line shown in each of FIG. 35 to FIG. 37 is a cuboid.

Figure 38:
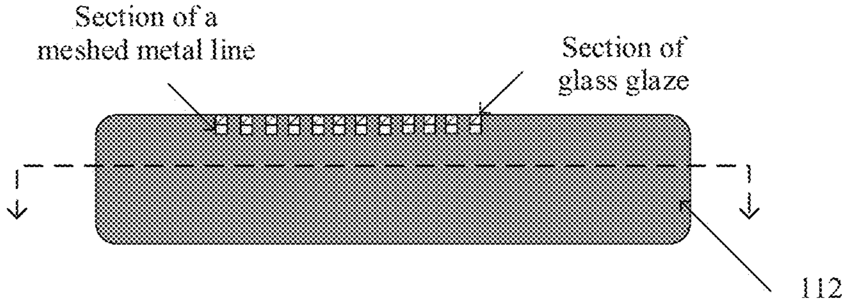
FIG. 38 is a schematic side view of an example in which glass glaze is disposed on a mesh-shaped metal line according to an embodiment of this application.

It should be further understood that glass glaze (or a glass glaze layer) may be further disposed on the mesh-shaped metal line. FIG. 38 is a schematic side view illustrating that glass glaze is disposed on a mesh-shaped metal line.

Figure 39:
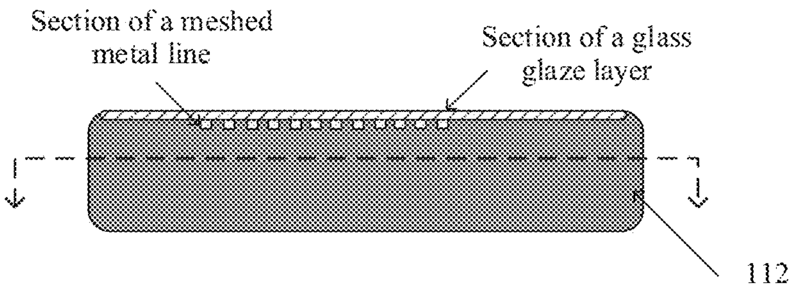
FIG. 39 is a schematic side view of another example in which glass glaze is disposed on a mesh-shaped metal line according to an embodiment of this application.
Figure 40:
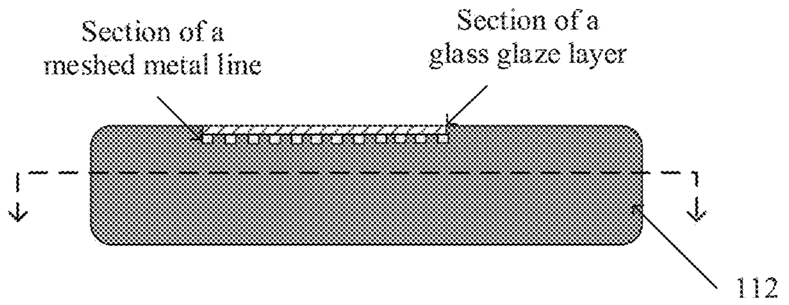
FIG. 40 is a schematic side view of another example in which glass glaze is disposed on a mesh-shaped metal line according to an embodiment of this application.

It should be further understood that, in this embodiment of this application, not only a mesh-shaped metal line region may be overlaid with glass glaze, but glass glaze may alternatively be disposed on the outer surface of the entire housing 112. For example, FIG. 39 is a schematic diagram illustrating that a glass glaze layer is disposed on an outer surface of an entire housing 112. Optionally, alternatively, only a mesh-shaped metal line region may be overlaid with a glass glaze layer. For example, FIG. 40 is a schematic side view illustrating that a glass glaze layer is disposed on a mesh-shaped metal line region.

It should be understood that a thickness of the glass glaze layer is not limited either in this embodiment of this application.

It should be further understood that a mesh-shaped metal line may be disposed on one or more regions on the housing 112. Positions of a plurality of regions (namely a plurality of antenna regions) may be located at any region on the outer surface of the housing 112. This is not limited in this embodiment of this application.

Optionally, in an embodiment of this application, a ceramic housing in which a mesh-shaped metal line is embedded may be obtained by using the following method:

First, a mould structure is designed based on a three-dimensional outline of the ceramic housing, and a biscuit of the ceramic housing is prepared by using a regular ceramic material forming technology such as dry pressing, tape casting, or injection. Then, the biscuit of the ceramic housing is sintered and densified under specific sintering parameters such as a specific temperature, atmosphere, and pressure, to obtain the ceramic housing; and the ceramic housing is processed in terms of a size, an outline, and the like by using a computer numerical control machine tool or through coarse grinding, polishing, or another manner. Then, a meshed groove is processed on an outer surface of the ceramic housing through laser marking, etching, or another manner based on requirements such as outlines, sizes, and positions of an antenna region and an internal line. Conductive slurry is prepared by mixing an inorganic conductive material solvent, and a polymeric additive such as adhesive; and the conductive slurry is coated in the meshed groove through spraying, brush coating, or another manner, to form a portion that subsequently serves as the metal line an antenna). The ceramic housing coated with the conductive slurry is put under specific sintering parameters such as a specific temperature, atmosphere, and pressure, to sinter the conductive material. Finally, a finished product of a ceramic cover in which the antenna is embedded is obtained after common processing of a mobile terminal cover, such as polishing and surface treatment for an appearance effect.

Optionally, in this embodiment of this application, the ceramic material may be any type of ceramics such as zirconium oxide, aluminum oxide, silicon carbide, silicon nitride, aluminum nitride, or boron carbide. It should be understood that the housing 112 may alternatively be prepared by using another ceramic material. This is not limited in this embodiment of this application.

Optionally, in this embodiment of this application, the surface treatment for an appearance effect includes one or more types of the following: coating, ink printing, film attachment, texturing, laser marking, or the like. Optionally, the surface treatment for an appearance effect may further include other processing manners.

Figure 41:
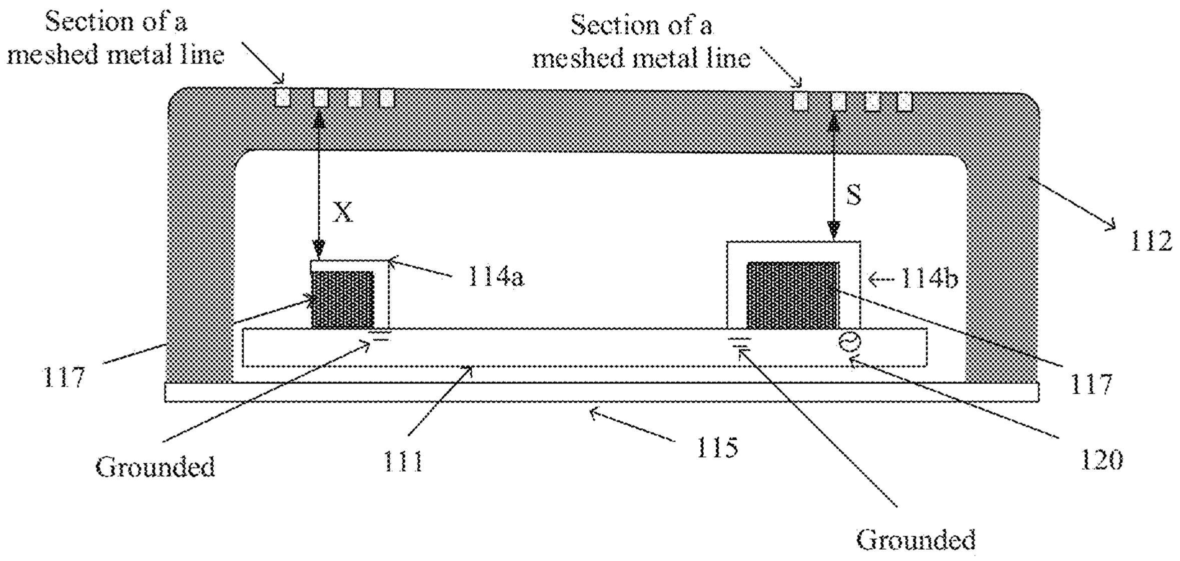
FIG. 41 is a schematic diagram of a distance between a mesh-shaped metal line and a signal line in an example according to this application.

FIG. 41 is a schematic diagram of a relative position relationship between a meshed metal line and a signal line in an example according to an embodiment of this application. The meshed metal line shown in FIG. 41 is embedded in an outer surface of a ceramic housing 112. Signal lines 114*a* and 114*b* are each disposed on a support 117. The support 117 is fixed onto a circuit hoard 111, and the support 117 is configured to support and fix the signal line 114. A feed-in manner between the metal line and the signal line is feed-in in a coupling manner. Shortest distances from the mesh-shaped metal line to the two signal lines 114*a* and 114*b* are respectively X and S. Optionally, a value range of X is 0.1 mm≤X≤5 mm, and a value range of S is 0.1 mm≤X≤5 mm.

Figure 42:
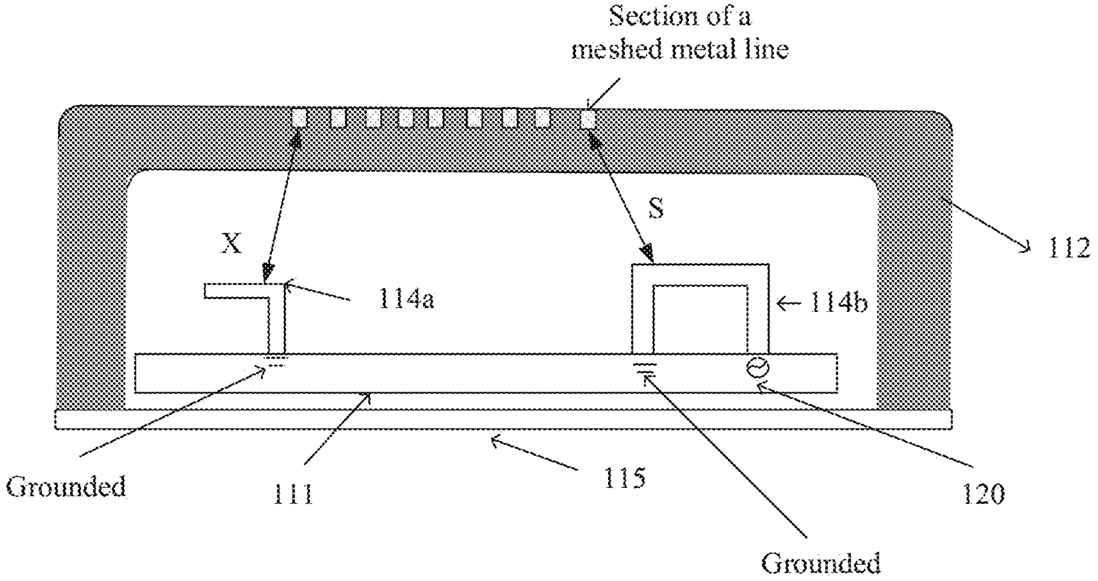
FIG. 42 is a schematic diagram of a distance between a mesh-shaped metal line and a signal line in another example according to this application.

FIG. 42 is a schematic diagram of a relative position relationship between a metal line and a signal line in another example according to an embodiment of this application. A structure shown in FIG. 42 does not include a support 117. The signal line uses a form of a spring. The spring is fixed onto a circuit board 11. A feed-in manner between the metal line and the signal line is feed-in in a coupling manner. Shortest distances from the mesh-shaped metal line to two signal lines 114*a* and 114*b* are respectively X and S. Optionally, a value range of X is 0.1 mm≤X≤5 mm, and a value range of S is 0.1 mm≤X≤5 mm.

It should be understood that, in this embodiment of this application, the distances X and S between the metal line and the signal line may alternatively be other values, provided that a distance between the metal line and the signal line is greater than 0. In other words, the metal line and the signal line are neither in direct contact nor in indirect contact through another connection part.

Optionally, in some possible implementations of this application, when the metal line is embedded in the housing 112, the housing 112 may include a plurality of insulation layers, and the metal line 113 is embedded between any two of the plurality of insulation layers.

Figure 43:
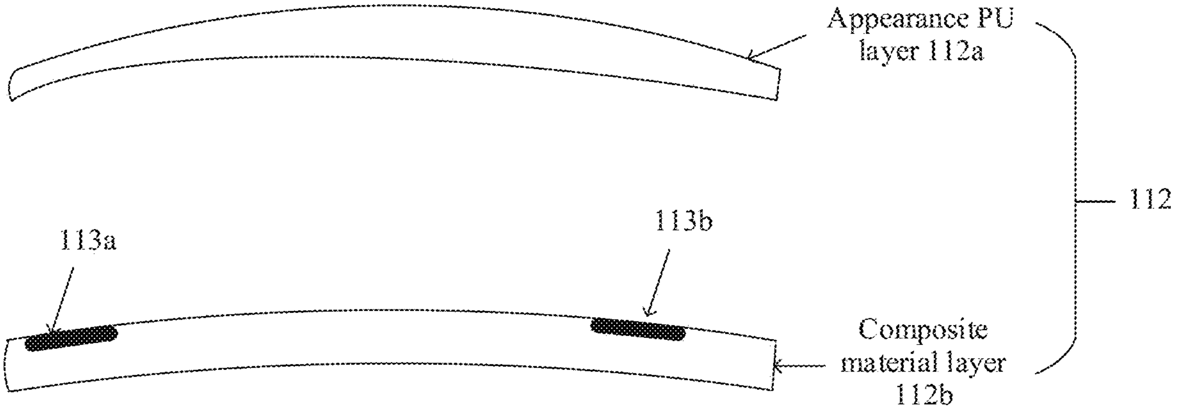
FIG. 43 is a side view of a schematic structure in which a housing includes a composite material layer and an appearance PU layer in an example according to this application.

As an example for illustration, the housing 112 includes two insulation layers, which are respectively 112*a* and 112*b* in FIG. 43. 112*a* and 112*b* form the housing 112. Metal lines 113*a* and 113*b* are embedded in the insulation layer 112*a*. Then, the insulation layers 112*a* and 112*b* are combined together as a whole to form the complete housing 112.

Figure 44:
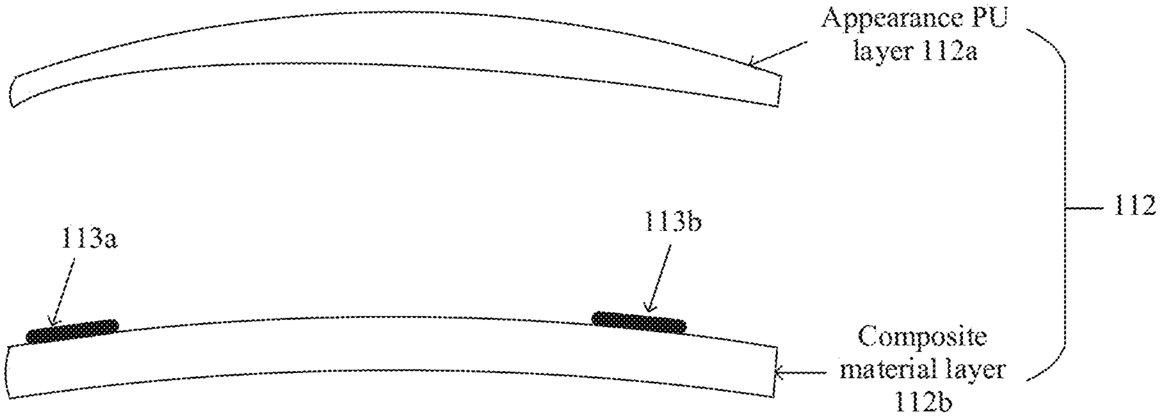
FIG. 44 is a side view of a schematic structure in which a housing includes a composite material layer and an appearance PU layer in another example according to this application.

FIG. 44 is a side view of a schematic structure in which a housing 112 includes two insulation layers. As shown in FIG. 43, the two insulation layers are respectively 112*a* and 112*b*. 112*a* and 112*b* form the housing 112. Metal lines 113*a* and 113*b* are fixed onto the insulation layer 112*b* through printing, bonding, metal coating, or the like, and then the insulation layers 112*a* and 112*b* are combined together as a whole to form the complete housing 112.

Figure 45:
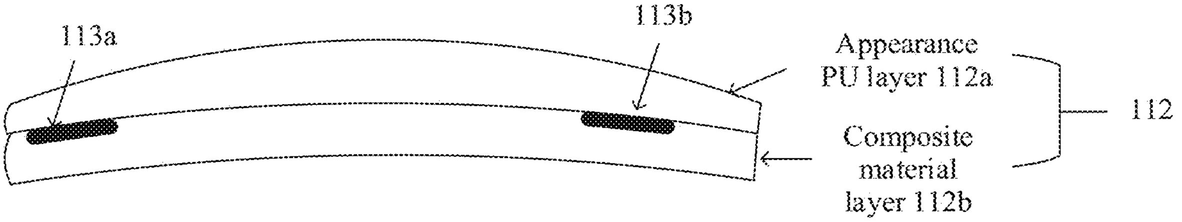
FIG. 45 is a side view of a schematic structure in which a housing includes a composite material layer and an appearance PU layer in another example according to this application.

FIG. 45 is a side view of a schematic structure in which a housing 112 includes two insulation layers. As shown in FIG. 45, the two insulation layers are respectively 112*a* and 112*b*. 112*a* and 112*b* form the housing 112. Metal lines 113*a* and 113*b* are embedded in the insulation layer 112*a*.

Figure 46:
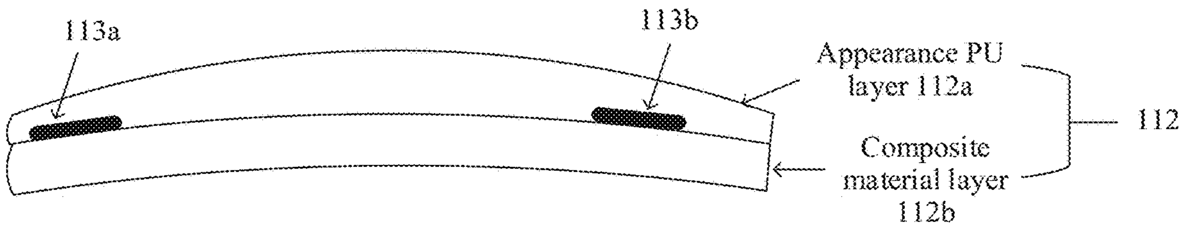
FIG. 46 is a side view of a schematic structure in which a housing includes a composite material layer and an appearance PU layer in another example according to this application.

FIG. 46 is a side view of a schematic structure in which a housing 112 includes two insulation layers. As shown in FIG. 46, the two insulation layers are respectively 112*a* and 112*b*. 112*a* and 112*b* through the housing 112. Metal lines 113*a* and 113*b* are fixed onto the insulation layer 112*b* through printing, bonding, metal coating, or the like.

Optionally, the insulation layer 112*a* may be made of a polyurethane (Polyurethane, PU) material, or the insulation layer 112*a* may be made of a leather material. Optionally, the insulation layer 112*a* may also be referred to as an appearance PU layer or a leather layer.

The insulation layer 112*b* may be made of a composite material. For example, a composite material layer may be made of any one or more of plastic cement, polycarbonate (Polycarbonate, PC), PE plastic, PP plastic, PVC plastic, PET plastic, a resin material, a rubber material, a fiber material, or other polymer materials. A specific type of the composite material is not limited in this application. The insulation layer 112*b* may also be referred to as a composite material layer.

Optionally, the metal lines 113*a* and 113*b* may be fixed onto the composite material layer through printing, bonding, metal coating, etching, or the like, and then the composite material layer onto which the metal lines are fixed and the appearance PU layer are combined together as a whole to form the complete housing 112.

Optionally, a metal line (an antenna) may be formed on a surface of a composite material layer. A thickness of the composite material layer may range from 0.05 mm to 0.6 mm. For example, the metal antenna may be formed on the surface of the composite material layer through laser activating plating (Laser Activating Plating, LAP), metal coating, or the like. Optionally, a thickness (a depth) of the metal line may range from 1 μm to 500 μm. After the metal antenna is formed on the composite material layer, an appearance PU layer or a leather layer is attached on the composite material layer. The metal antenna is wrapped by the PU layer or the leather layer. Therefore, the metal antenna is not in direct contact with an outer surface of a product. In this way, problems such as wear and peel-off of the metal line can be prevented, further improving the durability and use quality of the metal line and extending the service life of the metal line.

Figure 47:
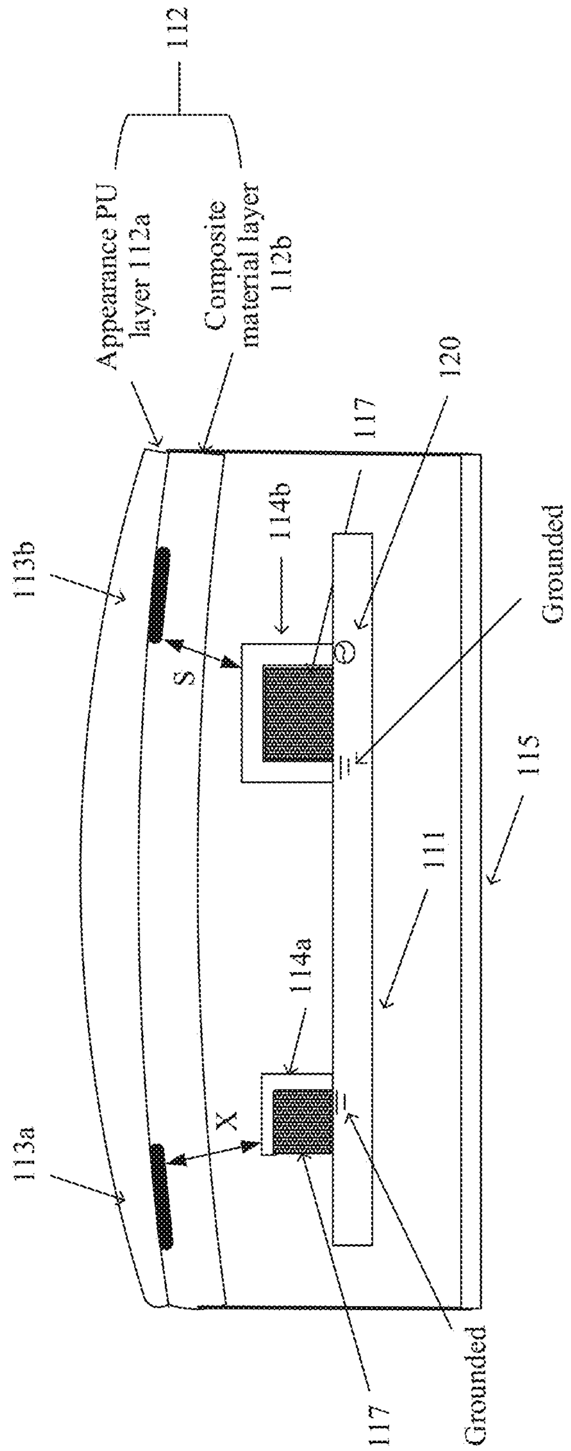
FIG. 47 is a schematic diagram of a distance between a mesh-shaped metal line and a signal line in an example according to this application.

FIG. 47 is a schematic diagram of a signal line when a metal line 113 is disposed between a composite material layer and an appearance PU layer. As shown in FIG. 47, metal lines 113*a* and 113*b* are disposed between the composite material layer and the appearance PU layer. One signal line corresponds to one metal line, or one signal line goes with one metal line. A feed-in manner between the metal line 113 and the signal line 114 is feed-in in a coupling manner. A distance between the metal line 113*a* and a signal line 114*a* is X, and a distance between the metal line 113*a* and a signal line 114*a* is S. Optionally, a value range of X is 0.1 mm≤X≤5 mm, and a value range of S is 0.1 mm≤X≤5 mm.

Figure 48:
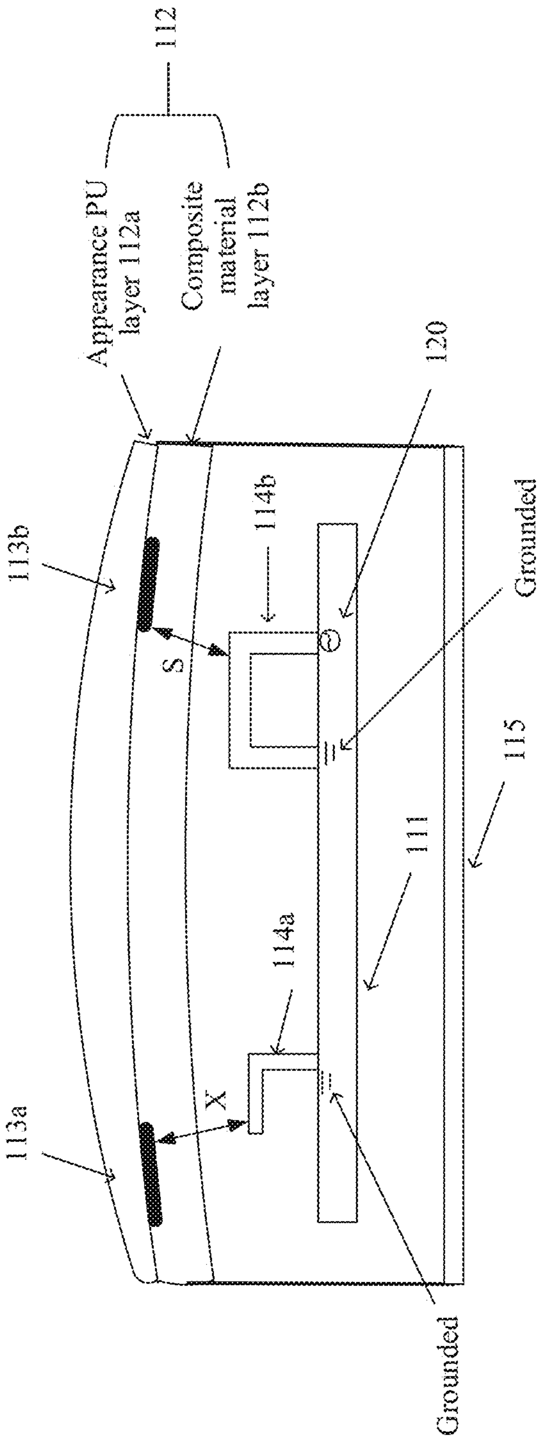
FIG. 48 is a schematic diagram of a distance between a mesh-shaped metal line and a signal line in another example according to this application.

FIG. 48 is a schematic diagram of a signal line when a metal line 113 is disposed between a composite material layer and an appearance PU layer in another example according to an embodiment of this application. Different from that in FIG. 48, a structure shown in FIG. 47 does not include a support 117. The signal line uses a form of a spring. The spring is fixed onto a circuit board 111. Metal lines 113*a* and 113*b* are disposed between the composite material layer and the appearance PU layer. A feed-in manner between the metal line 113 and the signal line 114 is feed-in in a coupling manner. A distance between the metal line 113*a* and a signal line 114*a* is X, and a distance between the metal line 113*a* and a signal line 114*a* is S. Optionally, a value range of X is 0.1 mm≤X≤5 mm, and a value range of S is 0.1 mm≤X≤5 mm.

It should be understood that, in this embodiment of this application, the distances X and S between the metal line and the signal line may alternatively be other values, provided that a distance between the metal line and the signal line is greater than 0. In other words, the metal line and the signal line are neither in direct contact nor in indirect contact through another connection part.

Figure 49:
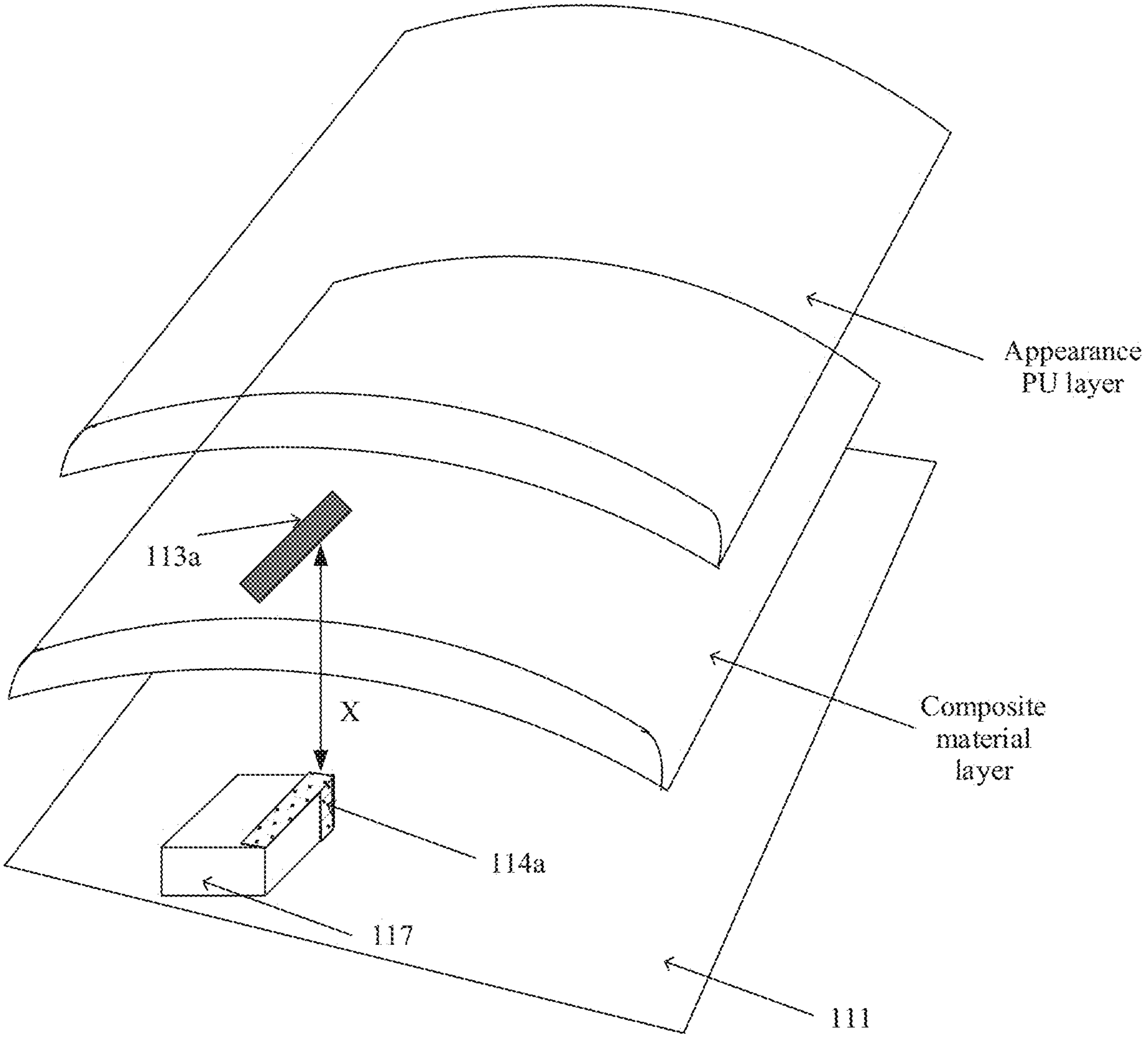
FIG. 49 is a schematic diagram of a relative position relationship between a metal line and a signal line in an example according to an embodiment of this application.

FIG. 49 is a schematic diagram of a relative position relationship between a metal line and a signal line in an example according to an embodiment of this application. A metal line 113*a* is disposed on an outer surface of a composite material layer. A housing includes the composite material layer and an appearance PU layer. A cuboid-shaped support 117 is fixed onto a circuit board 111. The support 117 is configured to support and fix a signal line 114*a*. The metal line 113*a* is located at a position right above the signal line 114*a*. A distance between the metal line 113*a* and the signal line 114*a* is X.

Optionally, a value range of X is 0.1 mm≤X≤5 mm.

Optionally, the metal line 113*a* may be a mesh-shaped metal line or may be a sheet-shaped metal line.

It should be understood that, in this embodiment of this application, a signal line may go with a plurality of metal lines. A distance between each of the plurality of metal lines and the signal line is greater than 0.

It should be further understood that the distance between the metal line and the signal line may be a minimum distance (a shortest distance) between the metal line and the signal line. In other words, the metal line is located at a position right above the signal line. For example, as shown in FIG. 41 or FIG. 49, a minimum distance between the metal line 113*a* and the signal line 114*a* may be a distance between the metal line 113*a* and the signal line 114*a* in a vertical direction. Certainly, a distance between the metal line and the signal line may alternatively be a distance between any position on the metal line and any position on the signal line. This is not limited in this embodiment of this application.

In the terminal device provided in this application, the antenna (the metal line) of the terminal device is disposed on the outer surface of the housing of the terminal device or embedded in the housing, instead of being disposed on an inner surface of the housing or disposed inside the terminal device by using an antenna support. This can increase a distance from the metal line to the circuit board of the terminal device, thereby reducing interference of a metal component on the circuit board to radiation of the metal line (radiation of the antenna) and improving operating bandwidth and efficiency of the antenna. In addition, a protective film is disposed on the metal line. In this way, problems such as wear and peel-off of the metal line can be prevented, further improving the durability and use quality of the metal line and extending the service life of the metal line. A gap exists between the signal line and the metal line; and feed-in in a coupling manner, instead of a direct feed-in manner, is implemented between the metal line and the signal line. This can enable the terminal device to accurately receive and send an electromagnetic wave signal, and avoid instability problems such as loose contact caused by the direct feed-in manner, thereby further improving the operating efficiency and quality of the antenna of the terminal device.

It should be understood that the foregoing embodiments and structures shown in the drawings are merely examples and should not constitute any limitation to the protection scope of this application. For example, FIG. 1 to FIG. 23 all illustrate that a metal line is disposed on an outer surface of or inside an insulated rear cover (back cover) of a terminal device. Optionally, the metal line may alternatively be disposed on an outer surface of an insulated housing on a side of the terminal device, inside the housing, or the like.

It should be further understood that the foregoing is merely intended to help a person skilled in the art better understand the embodiments of this application, but is not intended to limit the scope of the embodiments of this application. It is clearly that a person skilled in the art can make various equivalent modifications or changes based on the given examples. For example, some parts in the foregoing embodiments may be unnecessary, or some new parts may be added; or any two or more of the foregoing embodiments are combined. A solution obtained through such modifications, changes, or combinations also falls within the scope of the embodiments of this application.

It should be further understood that the foregoing descriptions of the embodiments of this application focus on differences between the embodiments. For same or similar content that is not mentioned, reference may be made mutually. For brevity, details are not described again.

It should be further understood that division of manners, cases, categories, and embodiments in the embodiments of this application is merely intended for ease of description and should not constitute particular limitations. Various manners, categories, cases, and embodiments may be mutually combined, provided that they do not conflict with each other.

It should be further understood that, in the embodiments of this application, unless particularly stated or logically conflicted, terms and/or descriptions between different embodiments are consistent and can be cross-referenced. Technical features in different embodiments may be combined to form new embodiments based on an internal logical relationship of the features.

It should be further understood that the foregoing is merely intended to help a person skilled in the art better understand the embodiments of this application, but is not intended to limit the scope of the embodiments of this application. It is clearly that a person skilled in the art can make various equivalent modifications or changes or combine any two or more of the foregoing embodiments based on the given examples. A solution obtained through such modifications, changes, or combinations also falls within the scope of the embodiments of this application.

The terminal device in the embodiments of this application may also be referred to as user equipment, an access terminal, a subscriber unit, a subscriber station, a mobile station, a mobile console, a remote station, a remote terminal, a mobile device, a user terminal, a terminal, a wireless communications device, a user agent, a user apparatus, or the like. The terminal device may further be a cellular phone, a cordless phone, a session initiation protocol (session initiation protocol, SIP) phone, a wireless local loop (wireless local loop, WLL) station, a personal digital assistant (personal digital assistant, PDA), a handheld device having a wireless communication function, a computing device, another processing device connected to a wireless modem, a vehicle-mounted device, a wearable device, a terminal device in a future 5G network, or a terminal device in a future evolved public land mobile network (public land mobile network, PLMN). This is not limited in the embodiments of this application.

In the embodiments of this application, the terminal device or a network device includes a hardware layer, an operating system layer that runs on the hardware layer, and an application layer that runs on the operating system layer. The hardware layer includes hardware such as a central processing unit (central processing unit, CPU), a memory management unit (memory management unit, MMU), and a memory (also referred to as a main memory). An operating system may be any one or more computer operating systems that implement business processing by using a process (process), for example, a Linux operating system, a Unix operating system, an Android operating system, an iOS operating system, or a Windows operating system. The application layer includes applications such as a browser, an address book, text processing software, and instant messaging software.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system and apparatus may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A terminal device, comprising:

a housing comprising an outer surface;

a metal line that is either disposed on the outer surface or is embedded in the housing, wherein the metal line is configured to receive or send an electromagnetic wave signal, wherein the metal line is a translucent metal line and comprises a metal mesh, wherein the metal mesh is coated with a metal layer, wherein the metal layer is configured to reduce impedance of the metal mesh, wherein a transmittance of the metal line is Y, and wherein a value range of Y is $50\% \leq Y \leq 95\%$;

a circuit board configured to hold electronic parts and components; and a signal line disposed on the circuit board and forming a gap between the signal line and the metal line, wherein the signal line and the metal line are configured to feed the electromagnetic wave signal through the gap in a coupling manner.

2. The terminal device of claim 1, wherein the housing further comprises a plurality of insulation layers, and wherein the metal line is embedded between two of the insulation layers.

3. The terminal device of claim 2, wherein the insulation layers are two insulation layers, wherein the metal line is embedded between the two insulation layers, and wherein the two insulation layers are glass layers.

4. The terminal device of claim 2, wherein the insulation layers are two insulation layers, wherein the metal line is embedded between the two insulation layers, wherein a first insulation layer of the two insulation layers is a glass layer, and wherein a second insulation layer of the two insulation layers is a plastic layer.

5. The terminal device of claim 2, wherein the insulation layers are two insulation layers, wherein the metal line is embedded between the two insulation layers, and wherein the two insulation layers are plastic layers.

6. The terminal device of claim 2, wherein the insulation layers comprise two insulation layers, wherein a first insulation layer of the two insulation layers is a glass layer, wherein a second insulation layer of the two insulation layers is a polyethylene terephthalate (PET) plastic layer, and wherein the metal line is embedded between the two insulation layers.

7. The terminal device of claim 6, further comprising a polyvinyl butyral (PVB) layer disposed between the glass layer and the PET plastic layer, wherein the metal line is disposed between the PVB layer and the PET plastic layer.

8. The terminal device of claim 6, further comprising a polyvinyl butyral (PVB) layer disposed between the glass layer and the PET plastic layer, wherein the metal line is disposed between the PVB layer and the glass layer.

9. The terminal device of claim 2, wherein the insulation layers comprise two insulation layers, wherein the two insulation layers are glass layers, wherein a polyvinyl butyral (PVB) layer is disposed between the glass layers, and wherein the metal line is disposed between one of the glass layers and the PVB layer.

10. The terminal device of claim 1, wherein the metal line is disposed on the outer surface, and wherein the terminal device further comprises a protective film disposed on a surface of the metal line.

11. The terminal device of claim 10, wherein the metal line further comprises silver paste or a copper wire.

12. The terminal device of claim 1, wherein the metal line is disposed on the outer surface, and wherein the terminal device further comprises a protective film disposed on the outer surface.

13. The terminal device of claim 1, wherein a distance between the signal line and the metal line is X, and wherein a value range of X is 0.1 millimeters (mm)$\leq$X $\leq$5 mm.

14. The terminal device of claim 1, wherein the housing is a glass housing.

15. The terminal device of claim 1, further comprising a metallic nickel layer coated on an outside of the metal layer.

16. The terminal device of claim 1, wherein the housing is a ceramic housing, and wherein the metal line is disposed on a surface of the ceramic housing.

17. The terminal device of claim 16, wherein a surface of the metal line is coated with a glass glaze.

18. The terminal device of claim 1, wherein the housing is a ceramic housing, and wherein the metal line is embedded in the ceramic housing.

19. The terminal device of claim 2, wherein the insulation layers are two insulation layers, wherein the metal line is disposed between the two insulation layers, wherein a first insulation layer of the two insulation layers is a composite material layer, and wherein a second insulation layer of the two insulation layers is a polyurethane (PU) layer.

20. The terminal device of claim 1, further comprising a second metal layer coating the metal layer, wherein the metal layer is a first metal, wherein the second metal layer is a second metal, and wherein the first metal and the second metal are different types of metal.

* * * * *